US011886808B2

(12) United States Patent
Brisebois et al.

(10) Patent No.: US 11,886,808 B2
(45) Date of Patent: *Jan. 30, 2024

(54) METHOD AND SYSTEM FOR CUSTOMIZING A MOBILE APPLICATION USING A WEB-BASED INTERFACE

(71) Applicant: ProntoForms Inc., Ottawa (CA)

(72) Inventors: Mitch A. Brisebois, Wakefield (CA); Brant Drummond, Dunrobin (CA); Arjun Mehta, Calgary (CA); Marc Chene, Ottawa (CA); Mark Flannigan, Ottawa (CA)

(73) Assignee: TrueContext Inc., Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,855

(22) Filed: Mar. 1, 2022

(65) Prior Publication Data

US 2022/0180054 A1 Jun. 9, 2022

Related U.S. Application Data

(63) Continuation of application No. 16/752,688, filed on Jan. 26, 2020, now Pat. No. 11,308,270, which is a continuation of application No. 16/205,600, filed on Nov. 30, 2018, now Pat. No. 10,585,982, which is a continuation of application No. 15/811,081, filed on Nov. 13, 2017, now Pat. No. 10,394,948, which is a continuation of application No. 12/522,687, filed as application No. PCT/IB2008/000070 on Jan. 11, 2008, now Pat. No. 9,836,446.

(60) Provisional application No. 60/880,170, filed on Jan. 12, 2007.

(51) Int. Cl.
*G06F 40/186* (2020.01)
*G06Q 10/00* (2023.01)
*G06F 40/174* (2020.01)

(52) U.S. Cl.
CPC .......... *G06F 40/186* (2020.01); *G06F 40/174* (2020.01); *G06Q 10/00* (2013.01)

(58) Field of Classification Search
None
See application file for complete search history.

(56) References Cited

U.S. PATENT DOCUMENTS

| | | | |
|---|---|---|---|
| 6,751,659 B1 * | 6/2004 | Fenger | H04L 67/61 709/224 |
| 7,616,971 B2 * | 11/2009 | Rouse | H04M 3/493 455/158.5 |
| 7,721,190 B2 * | 5/2010 | Sikchi | G06F 40/174 715/224 |
| 7,774,504 B2 * | 8/2010 | Chene | H04L 67/02 715/236 |

(Continued)

*Primary Examiner* — Howard Cortes
(74) *Attorney, Agent, or Firm* — Stratford Group Ltd.

(57) ABSTRACT

A system and method for customizing mobile-form applications via a web-based interface for distribution to a mobile device are disclosed. An example method includes providing a customizable mobile-form application template. A web-based interface is provided allowing creation of a customized mobile-form application from the customizable mobile-form application template by selecting a data field for inclusion on the customizable mobile-form application template. The customized mobile-form application may then be distributed to the mobile device.

16 Claims, 14 Drawing Sheets

(56) References Cited

U.S. PATENT DOCUMENTS

| | | | | |
|---|---|---|---|---|
| 7,779,482 B1* | 8/2010 | Yen | ................ | H04L 9/3226 726/30 |
| 7,971,148 B2* | 6/2011 | Papakonstantinou | ........................ | G06F 16/972 707/999.102 |
| 2002/0062342 A1* | 5/2002 | Sidles | ................ | H04L 67/561 715/224 |
| 2002/0194219 A1* | 12/2002 | Bradley | ................ | G06F 40/154 725/9 |
| 2003/0023626 A1* | 1/2003 | Bretti | ................ | G06F 40/174 715/223 |
| 2003/0110445 A1* | 6/2003 | Khaleque | ................ | G06F 9/451 715/224 |
| 2004/0039990 A1* | 2/2004 | Bakar | ................ | G06F 40/174 715/222 |
| 2004/0054569 A1* | 3/2004 | Pombo | ................ | G06Q 30/0601 709/217 |
| 2004/0268230 A1* | 12/2004 | Liu | ................ | G06F 40/103 715/201 |
| 2005/0005259 A1* | 1/2005 | Avery | ................ | H04L 67/04 717/102 |
| 2005/0014489 A1* | 1/2005 | Zhigang | ................ | H04M 3/4938 455/414.2 |
| 2005/0091651 A1* | 4/2005 | Curtis | ................ | G06F 8/65 717/174 |
| 2005/0195221 A1* | 9/2005 | Berger | ................ | G06F 16/9577 345/660 |
| 2005/0278645 A1* | 12/2005 | Maur | ................ | G06Q 10/10 715/762 |
| 2006/0161646 A1* | 7/2006 | Chene | ................ | G06Q 30/0633 709/223 |
| 2006/0168335 A1* | 7/2006 | Hodjat | ................ | G06F 40/174 709/239 |
| 2006/0206358 A1* | 9/2006 | Beaver | ................ | G06Q 10/10 705/2 |
| 2007/0073697 A1* | 3/2007 | Woods | ................ | G06F 16/9566 707/E17.115 |
| 2007/0130232 A1* | 6/2007 | Therrien | ................ | G06F 16/1873 |
| 2007/0201752 A1* | 8/2007 | Gormish | ................ | G06V 30/40 382/232 |
| 2007/0208665 A1* | 9/2007 | Ohara | ................ | G06Q 10/00 705/51 |
| 2007/0250783 A1* | 10/2007 | Wu | ................ | G06F 40/174 715/234 |
| 2007/0283413 A1* | 12/2007 | Shan | ................ | H04L 63/20 726/1 |
| 2007/0288837 A1* | 12/2007 | Eaves | ................ | G06F 16/958 707/E17.116 |
| 2008/0014906 A1* | 1/2008 | Tysowski | ................ | H04N 19/172 455/412.1 |
| 2008/0091780 A1* | 4/2008 | Balan | ................ | H04L 63/0428 709/204 |
| 2008/0151758 A1* | 6/2008 | Weinrib | ................ | H04W 28/0268 370/238 |
| 2008/0160958 A1* | 7/2008 | Abichandani | ................ | H04W 8/183 455/410 |
| 2008/0208949 A1* | 8/2008 | Tanaka | ................ | H04L 65/80 709/201 |
| 2010/0174974 A1* | 7/2010 | Brisebois | ................ | G06Q 10/00 715/780 |
| 2010/0198608 A1* | 8/2010 | Kaboff | ................ | G16H 40/67 715/741 |

\* cited by examiner

Lead Capture For Software Industry Mobile Sales Rep ▼ | Load | New Form | Clear

| Active Fields | Field Name | Field Type | Customize |
|---|---|---|---|
| | Field Name | Field Type | |
| ☑ | Name of Contact | Short Text Field | ▤ |
| ☐ | Title | ▶ Multiple Choice | |
| ☑ | Contact Details | | |
| ☑ | Address | Multiple Line Text Field | ▤ |
| ☑ | Telephone | Phone Number Input Field | ▤ |
| ☑ | Cellular | Phone Number Input Field | ▤ |
| ☐ | Fax | Phone Number Input Field | ▤ |
| ☐ | E-Mail | Short Text Field | ▤ |
| ☐ | Instant Messaging | Short Text Field | ▤ |
| ☑ | Web | Short Text Field | ▤ |
| ☑ | Organization/Company | ▶ Custom Multiple Choice | ▤ |
| ☑ | Organization/Company Size | ▶ Custom Scale | ▤ |
| ☑ | Sales Representative Name | ▶ Short Text Field | ▤ |
| ☑ | Priority | Scale 1-5 | ▤ |

☑ Enable "Assign To" Forwarding

| Save As | Save Changes |

Lead Capture For Software Industry Mobile Sales Rep ▼  [Load] [New Form] [Clear]

Active Fields

| | Field Name | Field Type | Customize |
|---|---|---|---|
| ☑ | Name of Contact | Short Text Field | |
| ☐ | Title | ▶ Multiple Choice | |
| ☑ | Contact Details | | |
| ☑ | Address | Multiple Line Text Field | |
| ☑ | Telephone | Phone Number Input Field | |
| ☐ | Cellular | Phone Number Input Field | |
| ☐ | Fax | Phone Number Input Field | |
| ☐ | E-Mail | Short Text Field | |
| ☐ | Instant Messaging | Short Text Field | |
| ☑ | Web | ▶ Short Text Field | |
| ☑ | Industry | ▶ Custom Multiple Choice | |
| ☑ | Organization/Company | ▶ Custom Scale | |
| ☑ | Organization/Company Size | | |
| ☑ | Sales Representative Name | Short Text Field | |
| ☑ | Priority | Scale 1-5 | |

☑ Enable "Assign To" F Assignment List
Brandt, Joe,
Evan, James,
Timothy, Jason
[Cancel] [Save]
Changes 530 — Assignment List
532 — Save
534 — Cancel
500 — (form)
460 — (overall)

FIG. 5B

Survey Builder

Survey Title: Customer Product Feedback and Evaluation Survey

TrueContext MobileSurveys

Questions

| # | Question Statement | Scale 1-5 | Yes/No | Text | Choice | Voice |
|---|---|---|---|---|---|---|
| 1 | Have you ever used one of our products before? | ○ | ● | ○ | ○ | ☑ |
| 2 | Which of our products have you used in the past? | ○ | ○ | ○ | ● | ☐ |
| 3 | How satisfied are you with our products? | ● | ○ | ○ | ○ | ☑ |
| 4 | Do you find that you use our products often? | ● | ○ | ○ | ○ | ☐ |
| 5 | Do you use your mobile device fo timesheet tracking applications? | ○ | ● | ○ | ○ | ☐ |
| 6 | What is the primary task you use your movile device for? | ○ | ○ | ○ | ● | ☐ |
| 7 | Where to you most often use your mobile device? | ○ | ○ | ○ | ● | ☑ |

Add new question

Save Survey    Cancel    Create Survey

Fig. 7e

METHOD AND SYSTEM FOR CUSTOMIZING A MOBILE APPLICATION USING A WEB-BASED INTERFACE

CROSS REFERENCE TO RELATED APPLICATION

This application is a continuation of U.S. patent application Ser. No. 16/752,688, filed Jan. 26, 2020, now allowed, which is a continuation of U.S. patent application Ser. No. 16/205,600, filed Nov. 30, 2018, now U.S. Pat. No. 10,585,982, which is a continuation of U.S. patent application Ser. No. 15/811,081, filed Nov. 13, 2017, now U.S. Pat. No. 10,394,948, which is a continuation of U.S. patent application Ser. No. 12/522,687, filed Feb. 23, 2010, now U.S. Pat. No. 9,836,446, which is a U.S. national stage filing of International Application No PCT/IB2008/000070, filed Jan. 11, 2008 and this application claims priority to U.S. Provisional Application No. 60/880,170, filed Jan. 12, 2007, all of which are hereby incorporated by reference in their entireties.

FIELD OF THE INVENTION

The present invention relates generally to mobile applications and, more particularly, to a system and method for customizing mobile-form applications using a web-based interface.

BACKGROUND OF THE INVENTION

Traditionally, most data in field force industries (e.g., field sales, field services, inspection and reporting, etc.) is distributed and captured on paper-based forms. The data entered on paper-based forms was typically returned to the business office to be manually entered electronically and integrated with a back office system. Furthermore, an enterprise business process might require the captured data to be reviewed by other members of the organization (e.g., authorization, up sell opportunity, billing, etc.) before, during, or after the field has interacted with the data. The process of distributing, updating, capturing, and returning form data and adapting it to a unique business process applies to a large number of mobile workers performing a variety of tasks such as, but not limited to, data collection solutions for inspections (e.g., property, health, etc.), field sales solutions reporting (e.g., lead capture, timesheet, expense reports, etc.), and field services solutions such as work order dispatches (e.g., HVAC, insurance claims, etc.).

Typically, in more complex forms-based business processes, work requests and form data are initially dispatched to field force workers using a voice channel (e.g., cell phone) or pre-printed paper forms (e.g., clipboard) that is then manually filled out or updated by the mobile worker (e.g., technician). A completed work request might also require one or many subsequent requests (e.g., required parts, required authorization, up-sell opportunities, etc.) that are typically done through a call over a cellular phone, or return trip to the office, or may cause the displacement of the mobile worker in addition, field inspectors may also capture data in the field using a series of paper forms and binders to complete their inspection tasks, resulting in a slow and inefficient process.

Businesses incur high wireless voice and vehicle fleet costs due to the above-described processes used in dispatching field workers, capturing or updating form data, and completing work orders or inspection forms in the field. Additionally, there are significant costs and inefficiencies with slow, manual processes for the exchange of data using paper-based forms, from the cost of the paper based forms, to duplicate data entry, to errors made in data capture on paper, to waiting for the person with the data to update another person or system, etc.

In order to reduce the use of paper, electronic forms may be used in conjunction with mobile devices such as portable computers. However such electronic forms and XForms (XML Forms) solutions (e.g., Adobe LiveCycle, Microsoft Infopath, FormDocs, Altova, Advantys, MDSI, X-Smiles, formsPlayer, and Novell XForms) are generally PC-centric and Local Area Network (LAN) oriented, as opposed to being optimized for mobile devices and wireless use. Additionally, these solutions are on-line and browser-centric, as opposed to being optimized for on- and off-line use over intermittently connected wireless networks with varying degrees of cost and quality of service. These solutions typically do not provide mechanisms for hosting multi-tenants (multi-domain) forms applications using a common IT infrastructure (e.g., Managed Service Provider hosted environment), nor do they have support for sophisticated routing and tracking of forms and policies that define a mobile forms application.

However, mobile devices are increasingly used for data collection as more and more mobile devices become available (laptops, cell phones, PDAs, tablet PCs, Ultra Mobile PCs, etc.) and as more and more content is available in electronic form (documents, email, pictures, commerce, videos, data etc.), and as access to devices and content becomes more and more ubiquitous (internet, wireless, etc.).

One challenge faced by organizations with a mobile workforce using such mobile devices to collect data is the timely and secure exchange of data. The collection of data using electronic forms has replaced paper forms in the computer environment. The availability of similar mobile solutions eliminates the need for use of paper in the field. Currently, trained programmers using a desktop-based design tool create forms based applications that work on mobile devices Once the form is created, it is then installed on a mobile device along with any other enabling software and components. However, such mobile solution applications do not always match existing corporate procedures and forms which employees have familiarity with A less than optimal solution is to have programmers "manually" program an application reflecting needed paper forms. This approach wastes programming resources and is not adaptable to changes in forms or business processes.

Thus there is a need for a user selected mobile-form application design interface. There is a further need for a customizable mobile-form template creation application. There is also a need for a system to provide ready distribution of custom mobile-form applications to mobile devices. There is another need for a web interface to allow a user to customize a mobile-form application without programming cost and time delays.

SUMMARY OF THE INVENTION

One disclosed example is a method for customizing a mobile-form application for distribution to a mobile device. A customizable mobile-form application template is provided. A customized mobile-form application is created from the customizable mobile-form application template using a web-based interface. The mobile-form application is created by editing a data field for inclusion on the customizable mobile-form application template.

Another example disclosed is a customizable mobile-form application system for customizing a mobile-form application for a mobile device. The system includes a customization interface accessible via a web-enabled device. The customization interface allows the creation of a customized mobile-form application including a data field. A data storage device is coupled to the customization interface to store the customized mobile-form application for distribution to the mobile device.

Another example disclosed is a web-based interface for customizing a mobile-form application for a mobile device. The interface includes a template selection control to select a customizable mobile-application template. A customization control is included to edit a data field to create a customized mobile-form application from the customizable mobile-application template.

Another example disclosed is a mobile device for the collection of data. The mobile device includes a customized mobile-form application customized via a web-based interface. A mobile-form application rendering client runs the customized mobile-form application on the mobile device. The customized mobile-form application allows the collection of data on the mobile device. A communications interface receives the customized mobile-form application and communicates the collected data. A display screen displays an interface of the customized mobile-form application rendered by the mobile-form application rendering client.

Another example disclosed is a system for creating a customized mobile-form application from a customizable mobile-form template. The system includes a template forms module to receive and the customizable mobile-form template. A customization module accessible via a web-based interface is included. The customization module is coupled to the template forms module to allow the creation of the customized mobile-form application from the customizable mobile-form template via the web-based interface.

Another example disclosed is an article of manufacture for creating a customizable mobile-form application. The article of manufacture includes a computer readable medium and a plurality of instructions. At least a portion of the plurality of instructions is storable in the computer readable medium. The plurality of instructions is configured to cause a processor to provide a customizable mobile-form application template. The plurality of instructions is also configured to cause a processor to provide a web-based interface allowing creation of a customized mobile-form application from the customizable mobile-form application template by selecting a data field for inclusion on the customizable mobile-form application template.

The above summary of the present invention is not intended to represent each embodiment, or every aspect, of the present invention. Additional features and benefits of the present invention are apparent from the detailed description, figures, and claims set forth below.

BRIEF DESCRIPTION OF THE DRAWINGS

FIG. 4A is an illustration of a screen view of a portal web-site interface with an interface for creating a customized mobile-form application.

FIG. 5A is an illustration of a screen view of the customization interface in FIG. 4A used to produce an example customized lead generation mobile-form application.

FIG. 5B is an illustration of the screen view in FIG. 5A showing a pop-up text box input for creating the customized lead generation mobile-form application.

FIG. 6A is an illustration of a screen view of the customization interface in FIG. 4A used to produce an example customized survey mobile-form application.

FIG. 6B is an illustration of the screen view in FIG. 6A showing a pop-up text box input for creating the customized survey mobile-form application.

FIGS. 7A-7E illustrate screen views of a mobile device display resulting from the operation of the customized lead generation mobile-form application in FIG. 5A.

Figure 1:
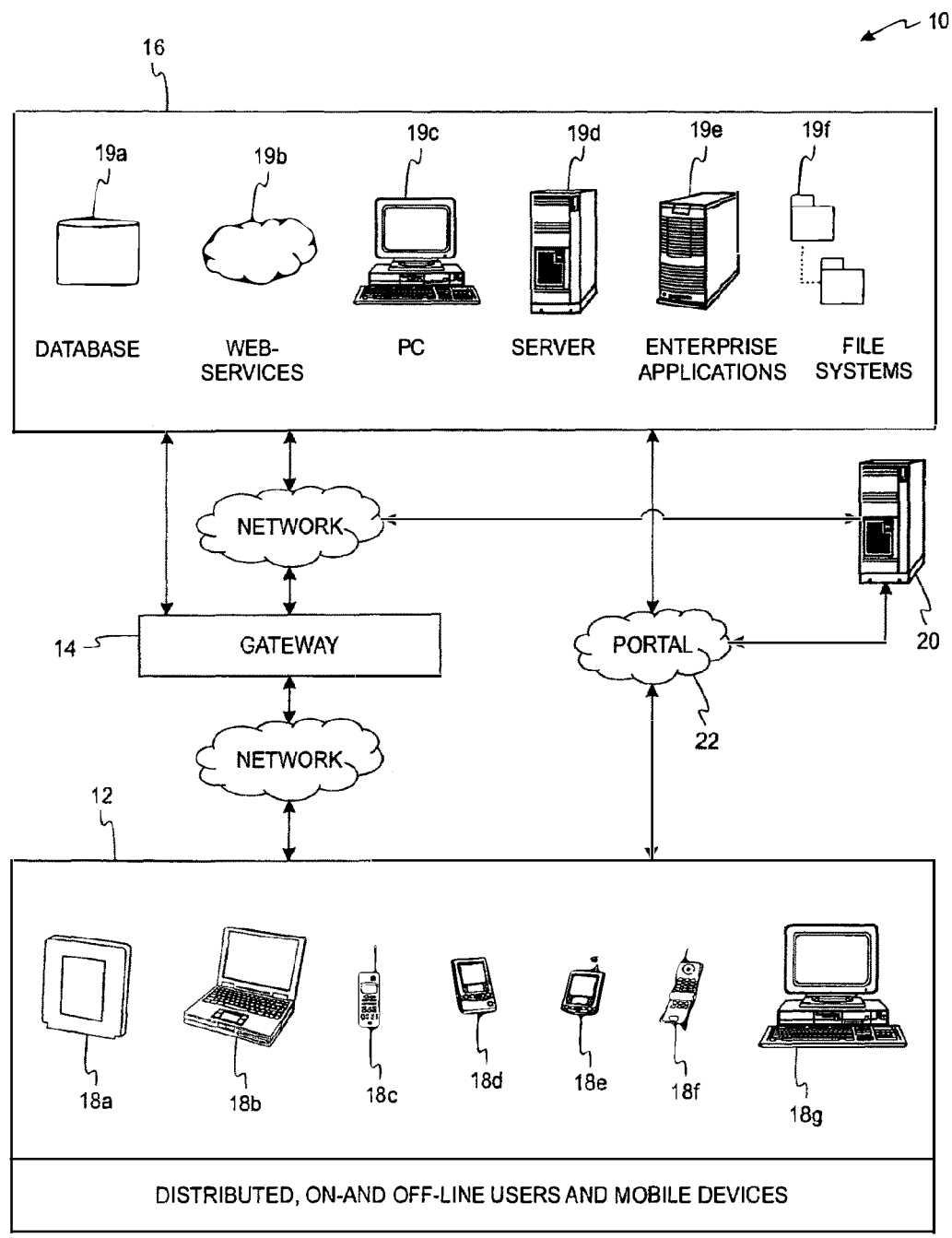
FIG. 1 is an illustration of a mobile data collection system utilizing customized mobile-form applications, according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Turning now to the drawings, FIG. 1 illustrates an example mobile device data collection system 10 which allows data collection via mobile-form applications installed on mobile devices. The mobile device data collection system 10 includes a Shared File Systems Explorer Client ("Explorer Client") 12, a Shared Mobile File Systems Gateway ("Gateway") 14, and a Mobile File System Mounting Client ("Mounting Client") 16. The Explorer Client 12 and the Mounting Client 16 are adapted to function on a plurality of user devices 18*a-g* which are, in some aspects, mobile devices. As illustrated, the Explorer Client 12 may be provided on devices including, but not limited to, a tablet PC 18*a*, a laptop computer 18*b*, a cellular telephone 18*c*, a cradled personal digital assistant (PDA) 18*d*, a wireless PDA 18*e*, a smart phone 18*f*, or a desktop computer 18*g*.

It is to be understood that the mobile devices 18*a-f* are examples and the data collection system 10 could support many identical, or different, mobile devices such as for example the PDA 18e distributed to numerous mobile users to collect data. The mobile devices 18a-f generally include at least one processor, a communication interface(s), input device(s) such as keypads or touch screens, and the like, and a display to facilitate user interaction with the device. The Mounting Client 16 may be provided to additional devices, such as, for example, a database 19a, web services 19b, a desktop computer 19c, an application server 19d, enterprise applications 19e, or file systems 19f The Gateway 14 may be provided on a mainframe (operating on a UNIX platform), a PC server, or a similar device. The Mounting Client 16 is also provided on a web portal server 20 which manages a web portal 22. Among the functions supported by the web portal 22, in this example, is the ability of the user to create customized mobile-form applications for distribution to mobile devices 18a-f by accessing the portal 22 through any browser enabled device such as the desktop computer 18g. The web portal server 20 is coupled via a network to the additional devices such as the database 19a and the server 19d. In this example, the desktop computer 19c is used to create customizable mobile-form application templates which are made available to the server 19d.

The Explorer Client 12 provides an interface from a wide variety of mobile devices 18a-f (using the native file explorer interface of the particular mobile device) for accessing and managing content across distributed, intermittently connected file systems 19f and other devices running the Mounting Client 16. The Gateway 14 allows users to create a centrally managed, fully distributed peer-to-peer file sharing and distribution network. Operators make the content of a file system 19f available for sharing by registering it using the Mounting Client 16. The Explorer Client 12 allows users to securely and efficiently move and copy objects between registered file systems. In addition, a number of advanced content management capabilities are provided by the Gateway 14 including an ability to inform a user when a piece of content has changed or become available. At the same time, administrators may track and report content usage including the specific association of content with users. Both the Mounting Client 16 and the Explorer Client 12 can communicate through firewalls to the Gateway 14.

The Explorer Client 12 is a native application that runs on the mobile devices 18a-f. The Explorer Client 12 contains components written in several different programming languages including C, C++, C#, .NET and Java. The Explorer Client 12 is adapted to run on a variety of different devices including devices running the Microsoft Windows Mobile OS (formerly Pocket PC or PPC), the Symbian OS, the Windows 2000 OS (Win2K, Windows Millenium), the Windows XP OS, the Windows XP tablet OS, the RIM OS, and the Palm OS.

According to one example, the Explorer Client 12 runs in the native file system of the mobile devices 18a-f. Thus, a user is able to utilize the Explorer Client 12 without any additional training. Further, the Explorer Client 12 supports the full capabilities of the native file system on the mobile devices 18a-f. This provides a "highest common denominator approach" to content management.

According to another example, implementation of the Explorer Client 12 provides a "thin client" that runs in a browser. This provides "lowest common denominator" coverage especially for those devices whose file system capabilities are limited (e.g., RIM) It also enables users to access content when they are not requesting the content from their own mobile devices 18a-f.

The Explorer Client 12 includes a communication stack module which allows for communication between the Explorer Client 12 and the Gateway 14. According to one example, the communication stack module allows the Explorer Client 12 to communicate with the Gateway 14 in the Hypertext Transfer Protocol over Secure Socket Layer (HTTP over SSL) or Transport Layer Security (TLS) protocol. SSL is an open, nonproprietary protocol that uses a 40-bit key size for the RC4 stream encryption algorithm, which is considered an adequate degree of encryption for commercial exchange. Further, HTTP over SSL supports the use of X.509 digital certificates from the server so that, if necessary, a user can authenticate the sender. Other encryption techniques such as the Advance Encryption Standard (AES) may be utilized. For example, an s-mime technique could also be adopted where the target application is e-mail. Furthermore, the forms designer can specify that the data captured as an XML document on the mobile device may be encrypted using a public or secret-key cryptosystem (e.g., Kerberos, PKI, etc.) to properly secure the content on the mobile device if the device was stolen or lost, or if any of the devices 19a-f or the portal server 20 was compromised.

According to one embodiment, the communication protocol of the system 10 utilizes HTTP(S) as the preferred protocol to transport all data files. The system 10 may utilize, as the preferred protocol to distribute and notify other internal or external resources (e.g., users, other machines, etc.), HTTP/HTTPS, SyncML, ActiveSync, SOAP, SMTP, FTP, SMS, SNMP, SMPP, RMI, IIOP, etc. Other communication protocols can be utilized without nullifying the key attributes of the above-described implementation. For example, web extensions such as SOAP and .NET can also be utilized, as well as proprietary communication protocols. A policy-based mobile content engine may also act as an authorizing proxy for each of these protocols that allows the mobile-form applications to communicate in real time with one or more enterprise content sources 19e hosted behind the enterprise firewall. For example, a drop down list in a mobile-form application could be dynamically generated by a SOAP request to an enterprise content source 19e The mobile content engine would apply appropriate policies both before and after routing the SOAP request from the mobile-form application onto the enterprise content source 19e.

The Explorer Client 12 also includes encryption libraries which are native device libraries that support encryption. According to one example, the mechanism for encrypting is SSL or TLS and the libraries are native SSL or TLS libraries. The Explorer Client 12 further includes a Client User Interface (CUI). The CUI provides a mechanism for presenting to the user a view of one or more file systems 19f and for manipulating the contents of those files systems 19f. According to one example, the mechanism for implementing the CUI is to utilize an existing native file explorer application, on the mobile devices 18a-f, that has been suitably extended. It is generally known within the industry that the native file explorers support such extensions.

The Explorer Client 12 also contains an authentication and authorization module. This authentication and authorization module enables a user of a device 18a-g to be authenticated and authorized against the Gateway 14, and includes communication and user interface components. The Explorer Client 12 may enable existing authentication such as LDAP and RADIUS servers (local or remote, outside or behind the firewall with support for "single sign on" schemas) among others, to be used by the Gateway 14 to authenticate users of the devices 18a-g or other devices 19a-f. Authorization providers are used to determine it the client is authorized based on their access permissions determined, but not limited to, the client's role and/or group access permission on the accessed resource (e.g., updating or creating a forms data instance).

Finally, the Explorer Client 12 contains a mechanism for view management that allows the Explorer Client 12 to present a view of the content available to the user (based on their permissions and other restrictions enforced by the Gateway 14) across one or more of the remote file systems. According to one embodiment, the implementation of this mechanism maintains a folder hierarchy view of virtual directories (network folders).

The Gateway 14 provides a centralized network access point between the Explorer Client 12 and the remote, distributed, intermittently connected file systems 19f. The Gateway 14 preserves the native security of the remote file systems 19f while enabling additional layers of security and administration specific to the system 10.

In this example, the Gateway 14 is a primarily java application that runs within an existing web application server. The Gateway 14 can run on a number of different application servers including BEA Weblogic, and IBM Websphere and on a number of different operating systems including, but not limited to, Windows NT, Windows Server, Solaris, Linux, and HPUx.

The Gateway 14 is able to provide security across multiple network domains. It can secure content and authorize users wherever the content or users are regardless of whether they are inside or outside a corporate firewall. For example, in a Management Service Provider (MSP) or an Application Service Provider (ASP) environment, the Gateway 14 can flexibly control security and access between and across different corporate domains each with a different authentication and authorization models. The Gateway 14 includes support for Kerberos, VPNs, etc.

The Mounting Client 16 provides an interface from a wide variety of devices such as the devices 19a-f and the portal server 20 to publish or enable access to the local file system 19f via the Gateway 14. The Mounting Client 16 has the exact same components and modules as the Explorer Client 12, except that instead of a CUI the Mounting Client 16 has a File Mounting User Interface (FMUI) and includes additional components, such as a delta scan and security components. Utilizing the FMUI, a user can navigate and select portions of their local file system 19f, and then navigate and indicate where in the Gateway 14 network folders the content should be made available on the Gateway 14. At this time, the Explorer Client 12 and Gateway 14 assimilate the containment structure and establish references to each of the folders and file objects therein. In this manner, the content on the newly mounted remote file system 19f is incorporated into the virtual abstraction layer maintained by the Gateway 14 and viewed through an Explorer Client 12.

In addition to the file system mapping/mounting capability, the Mounting Client 16 allows users to "copy" or "move" digital content into file systems 19f that are local to the Gateway 14. This capability is useful in situations where the user does not care that the remotely accessible content is not tied to the original content in the file system 19f.

The portal 22 supports a website which allows a user, according to access granted via the Explorer Client 12 and the Mounting Client 16, accessibility to files stored on the remote file system 19f and potential access to other devices running the Mounting Client 16. The portal 22 provides an interface which allows a properly authenticated and authorized user to perform different functions via connection of a web-browser enabled device such as the devices 18a-18g. In this example the portal server 20 has access to the database 19a and applications which are run on the server 19d in order to provide a user of the portal 22 the ability to customize mobile-form applications, as will be explained below.

The portal server 20 includes an HTTP server component which serves as a central access point for end-users such as the users of the devices 18a-g. The end-users may also interact directly with a client stub, which communicates with the HTTP server component. The HTTP server component is in communication with style sheet components and a view controller component to ensure proper formatting of content to users who request the portal 22. The view controller is in communication with the application server 19d, which serves as a central server for handling requests from the portal 22 for functions such as the customization of mobile-form applications.

In this example, the application server 19d provides an Enterprise JavaBeans (EJB) container at the business logic layer and performs load balancing and clustering operations to enable efficient workflows in the system 10. The application server 19d may be the device through which other components and modules as will be described below are implemented. It is preferred to use a host for the application server 19d that is capable of handling thousands of concurrent processes, thousands of open sockets, and several megabytes of data. The application server host must have enough processing power to handle multiple concurrent tasks, and multiple CPU systems are preferred as application server hosts according to one example of the application server 19d. The application server 19d also needs sufficient random access memory (RAM) to process a large amount of media and textual data per transaction, as well as to meet caching database requirements. The application server host has sufficient disk space to store an operating system and required software to perform patches and updates, cache information from databases such as the database 19a when the information is not in RAM, and to store server logs and error reports.

It is preferred for the system 10 to be agnostic to application servers, such that a variety of different types of servers may be used as application servers. This server agnosticism contributes to the ability of the system 10 to utilize a distributed architecture and to facilitate redundancy, scalability, and clustering in different types of deployments of the system 10.

The system 10 in FIG. 1 provides superior end user, network, and client performance in several different ways. First, data compression may be used both in downloading newly dispatched and uploading updated form data instances. Furthermore, the application server 19d determines when file attachments associated with the mobile-form application data instance should be delivered to the mobile devices 18a-f using both the type of network and attachment size. Additionally, the system 10 supports external model updates (e.g., customer list, price list, inventory list, etc.). These types of lists typically consist of a large amount of data that should only be updated at given times or when network availability permits. For more time critical updates to the list, byte level differencing and data compression can be used to update the end-users list with the changes rather than the updated list. This may reduce the network data consumption by over 80% depending on the changes made to the list. Byte level differencing is done by transmitting only the changes between the old list and the new list (byte level differences) and by applying those changes as an update to the old list on the mobile devices 18*a-f* to create the new list on the mobile device. It can also be used to update an attachment to a form data instance.

The system 10 provides superior availability to mobile workers by enabling offline form filling when confined to areas with restricted network connectivity and by enabling online, near real time, updates of form data to the server. Further, the system 10 helps to ensure that mobile-form applications whether standard or created by user customization and associated resources (e.g., external lists), are pushed as mandatory items. The system 10 controls delivery of captured data instances and mobile-form applications to the mobile devices based on, but not limited to, network connectivity, time, etc. Near real time or scheduled updates to a mobile-form application file is enabled by, for example, using byte level differencing and data compression to reduce the size of the markup transported to the mobile device. The system 10 further enables automatic calculations, comparisons, enforced fields, data input limitations, mandatory fields, contextual form behavior, read-only and pre-filling of form data, thus assisting in speeding up data capture and business process completion.

Figure 2:
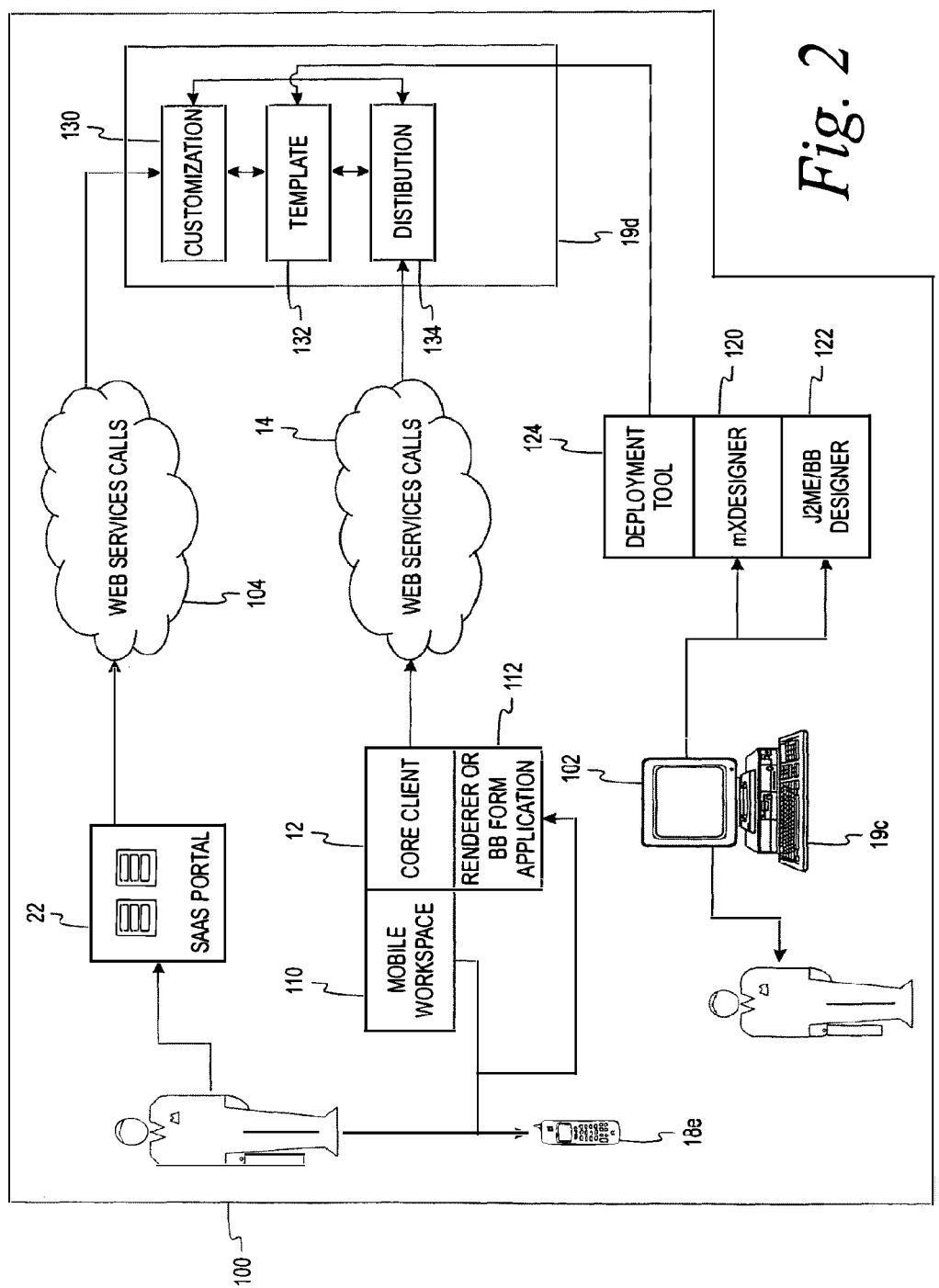
FIG. 2 is an illustration of a block diagram of the components of the system in FIG. 1 that are used to create mobile-form application templates, customize the templates to create customized mobile-form applications and distribute the customized mobile-form applications to mobile devices.

FIG. 2 illustrates a component block diagram 100 of the example components of the system 10 in FIG. 1 that are used to create customizable mobile-form application templates, create customized mobile-form applications from the customizable mobile-form application templates and distribute the customized mobile-form applications to mobile devices. The mobile-form applications are downloaded on the different devices in system 10 such as the mobile devices 18*a-f* in FIG. 1 via the Gateway 14, the Explorer Client 12 and the Mounting Client 16. The component block diagram 100 includes the portal 22 that is used to provide a webpage interface for a user to customize mobile-form applications, a template design station 102 such as the desktop computer 19*c* which is used to create customizable mobile-form application templates, the server 19*d* and a mobile device such as the mobile device 18*e*. The portal 22 is coupled to a layer of webservice Application Programming Interfaces (API) 104 which allow the portal 22 to interface with the server 19*d* and web-browser enabled devices. The API layer 104 provides support for the functionality for customizing mobile-form applications via the portal 22.

The example mobile device 18*e* includes a mobile workspace application 110, a form rendering application 112 and the Explorer Client 12. As explained above, the Explorer Client 12 provides access and communication through the Gateway 14 with the components such as the server 19*d* of the system 10 in FIG. 1. The Explorer Client 12 and server 19*d* in this example provide all APIs and retrieve all files and applications required to support functions such as data collection via the mobile-form applications on the mobile device 18*e* The mobile workspace application 110 provides an interface that allows the user to select a template and access the portal 22 to create a customized mobile-form application. The form rendering application 112 takes customized mobile-form applications and any other mobile-form applications and renders the form to the end user on the display screen of the mobile device 18*e*. This allows the user to perform functions such as, but not limited to, collecting data using such mobile-form applications on the mobile device 18*e*. The form rendering application 112 includes rendering engines using the XML-based forms application definition markup language to render a rich set of GUI form controls and to process the corresponding behavior of the mobile-form application for the end-user. The rendering engines are adapted to create a fully configurable look and/or feel for the end-user. Furthermore, the form rendering application 112 is capable of displaying (read-only or read/write), updating, and capturing the end-user's inputted data on- or off-line as one or more XML documents, as well as attachment files and managed lists that may be in a format other than XML.

The form rendering application 112 is also able to display, update, capture and attach a wide variety of multi-media content to the form data available to the mobile devices. Alternatively or additionally, the rendering engines in the form rendering application 112 are adapted to encode this data to the XML form data instance as a base64 encoded element or reference the inputted text or binary file as a separate entity. The form data may include, for example, signatures, photos, voice notes, sketches, global positioning information, GoogleMaps, bar code scanning information, automobile monitoring information, etc.

The content used by the form rendering application 112 may either be embedded within the XML form data (base64 encoded) or be referenced and managed as attachment files in a very elegant way as content under the control of policies that control how the content is managed and distributed (e.g., not forcing sending large multimedia files associated with the form when the form is submitted wirelessly— unlike other database/sync or real-time forms solutions) The form rendering application 112 may support a wide variety of technologies and input devices (e.g., Personal Digital Assistants (PDAs), smartphones, etc.) for data capture and form navigation. The input devices are linked to and interact with controls defined in the mobile extensible forms markup language to provide and enable data capture and form navigation.

By way of example, the form rendering application 112, via the defined controls, are adapted to support a plurality of input devices, such as: keyboards (e.g., PC keyboard, keypad, Simple Input Panel (SIP), soft-keyboard, touch screen display inputs, etc.); navigation, mouse, and I/O devices (e.g., optical mouse, RS-232 standard modules, touch-screens, scroll wheels, USB memory dongles, hard-drives, etc.); writing instruments and pointers (e.g., stylus, electronic pen/ink, handwriting to text conversion apps, etc.); audio (e.g., speech to text recognition, speech used for the selection of an item from a list, speech used for form navigation using technology such as VRML, voice recorders, etc.); infrared reader; magnetic reader and cards (e.g., swipe card, proximity card, smart card, expandable media cards and storage devices such as, for example, SD, MMC, compact flash, memory stick, etc.), Radio Frequency Identification (RFID); external or internal device peripheral (e.g., GPS, environmental meter, printers, etc.) including devices or data monitoring and reporting modules within an automobile (e.g., telematics); external or internal applications (e.g., VoIP softphone software, GPS software, etc.); scanners (e.g., optical character reader (OCR), bar code, biometric, etc.); incoming messages (e.g., via SMS, Smart Messages, OMA, SyncML, Email, SNMP, Active Sync, SMPP, SMTP, RSS/XML, etc.); and camera and digital imaging tools and devices.

The template design station 102 includes a variety of design tools to create customizable mobile-form application templates. In this example, the template design station 102 includes an mXDesigner application 120 and a J2ME/BB design application 122. Completed templates are deployed to the server 19*d* via a deployment tool 124. In this example, the mXDesigner application 120 is a forms toolkit available from TrueContext of Ottawa, Canada. The J2ME/BB design application 122 is a collection of Java APIs for the development of forms for mobile devices such as the mobile devices 18a-f in FIG. 1. Of course other forms development tools may be used on the template design station 102.

In particular, the template design station 102 allows a user (having minimal or no scripting, programming, or coding knowledge) to create a customizable mobile-form application template. The customizable mobile-form application template may be defined in terms of: (i) a mobile forms application definition markup language (e.g., mXForms); (ii) the XML-based policy model that applies to the captured data; (iii) the targeted OS-enabled mobile device (e.g., PCs, TabletPCs, Laptop, PDA, Smartphone, Handheld, Handset, Browser-enabled mobile device, Ultra Mobile PC, etc.) or browser for the forms application definition; and (iv) the means of distribution of the forms-based application to targeted users (e.g., via push technology, SMTP, or available through a Uniform Resource Identifier (URI), etc.) based on the design tools available on the template design station 102.

In this example, the mXDesigner application 120 is a simple Integrated Development Environment (IDE) which may be a standalone PC-based application, an add-in to an existing application (e.g. Microsoft Visual Studio) or other structure to create the customizable mobile-form application templates. The data structure of the forms instance associated with the customizable mobile-form application template created by the mXDesigner application 120 may be created by importing (e.g., via an enterprise content source) XML schema definitions or an instance of an XML file that is used as a demarcation point for back-end system integration. This includes flexible handling of version control and change propagation and data migration when refinements are made to the schema upon which a mobile-form application is based. The mXDesigner application 120 supports upgrades to a customizable mobile-form application without disrupting the use of the forms solution by the field workers. Changes to the model shared between multiple participants are carefully migrated to the upgraded data records or instances transparently to the users of the forms solution. Version control on the data instances is important to understanding the data migration that needs to occur—possibly on the fly—at the time it is created and/or updated on the server 19d by a field tech during the transition period until every field worker has the upgraded application/model on their user device.

The initial look and feel presented by the customizable mobile-form application template is defined by the mXDesigner application 120. The mXDesigner application 120 allows a user to create the customizable mobile-form application templates using a rich set of form controls that can be dragged and dropped or defined on a single or multiple form view as will be explained below. The mXDesigner application 120 enables the use of drag and drop properties and other types of controls to define the look and feel as well as the form flow or navigation of the customizable mobile-form application template. The form flow is how the user of the mXDesigner application 120 can use a forms control (e.g., button, image, link, menu item, etc.) to modify customizable mobile-form application templates. The form flow is mostly defined by an action added to a button. Conditional navigation can be controlled by the behavior typically defined by the "bind" property of the control or the parent container of the control. The mXDesigner application 120 can associate actions to the form control to define the form flow.

The mXDesigner application 120 further defines a rich set of templates to speed the creation of or build customizable mobile-form application templates (new or updated templates) for specific OS-enabled targeted devices. This includes a translation service that helps with the automatic translation (and optimization) from a mobile-form application template optimized for one device into other devices (e.g., browser, laptop, etc.), as opposed to the user having to start from scratch for each device. The mXDesigner application 120 defines several wizards to simplify the steps to create, modify, copy, publish, test, etc. a mobile-form application template and includes a test environment to process the authored mobile-form application template definition files on the targeted device. Additionally, in this example, the mXDesigner application 120 provides workflow and form data validation through the search values and the predefined policies for a targeted participant for the workflow and the behavior as defined in XForms for validation.

Typically, when a mobile-form application template is developed utilizing the mXDesigner application 120, the user information, groups, and access rights are generated as well. However, as the access rights change over time, the end-user administrator can adjust the access rights, users, or groups accordingly. This allows the end-user's IT department to manage their content and resources in a secure, desirable, and efficient manner.

The mXDesigner application 120 allows custom-built mobile-form application templates available on a thick or a thin client. It may also enable a forms designer to define all aspects of the customizable mobile-form application template, target mobile devices, associate a test environment where the customizable mobile-form application templates can be tested, associate business workflow, form navigation, behavior, data capture and define how the customizable mobile-form application templates can be procured and how they can be distributed, updated, or revoked from privileged users of the portal 22.

The server 19d in this example includes a customization module 130, a template forms module 132 and a mobile-form application distribution module 134. The customization module 130 includes APIs to interface with the portal 22 and edit customizable mobile-form application templates to create customized mobile-form applications. The template forms module 132 manages the customizable mobile-form application templates created from the template design station 102 and makes the customizable mobile-form application templates available to the customization module 130. The mobile-form application distribution module 134 is coupled to the customization module 130 and the template forms module 132 and makes customized mobile-form applications available to mobile devices such as the mobile devices 18a-f in FIG. 1. It is to be understood that the different modules 130-134 may be distributed to other servers and the subfunctions of each module 130-134 may be divided between other servers.

The mobile-form application used by the mobile devices 18a-f, according to one example, are specified in XML-based forms application definition markup language based on the W3C XForms specification to define a rich presentation of forms rendered in a Graphical User Interface (GUI) by the mobile forms application thick or thin-Client. Some enhancements have been made to extend the XForms schema to make it more efficient for mobile-form applications, as well as to support layout of form controls on mobile devices, and integrating routing of forms between users in a mobile-form application. An XML-based policy model is utilized by the mobile-form applications to define application and form states, workflow, validations, conditions, and actions to be processed for the life cycle of a new or updated form data instance. The policy model defines how the form data is managed (e.g., transformation and validation of data, publication of data to targeted resources, publication of data based on the type network connection, notifications and alerts to users based on form actions and events, etc.) and distributed, as well as to whom (people, systems, resources, etc.) it is distributed.

As discussed above, the mobile extensible forms markup language (mXForms) used in the mobile-form applications is based on the XForms W3C recommendation. The mXForms markup language defines how to render rich GUIs on-line or off-line for mobile devices, and display, update and captures data mXForms and XForms distinctly define the presentation definition (look and feel), the format of the data captured, form controls, and the behavior of the forms-based application (e.g., data validation, navigation, workflow, actions, etc.). The mXForms language can fully leverage the limited display and functionality (including native and external peripherals—e.g., barcode scanner, GPS module, etc.) of some of the targeted mobile devices. Multiple views or mobile forms applications may be required to complete the data capture of a forms-based application, including support for contextual (e.g., dynamic) views or interaction with the form (e.g., Y happens only if the user has selected X in the form). Unique form controls are also needed to display, add, edit, and delete repeating line items on such limited devices. The markup language also affords for creation of unique form controls that future business processes may require. These multiple views and form controls can be used on- or off-line, via thin/thick clients on mobile devices that are OS-enabled.

With the system 10, a user is able to go to access a "self-serve" website via the portal 22 in FIG. 1 and select a pre-built mobile-form application or applications to make available to mobile devices such as the mobile devices 18*a-f*. Alternatively, the user may use a wizard or interface to define and build a new customized mobile-form application via the portal 22. The mobile-form application template or new build interface is displayed with default settings that are ready for use and customization Before making the customized mobile-form application available to users of mobile devices such as the mobile devices 18*a-f* in FIG. 1, the user is able to view the default settings of the customizable mobile-form application template and adjust certain design or data elements to create a customized mobile-form application via the portal 22.

The customization module 130 interfaces with the portal server 20 to provide a web-based interface such as a webpage over the portal 22. Thus a user may use a browser enabled device to access the webpage and design and customize a mobile-form application. Specifically, the web based interface for mobile-form application customization allows actions such as 1) Uploading logos, images or custom graphics; 2) Choosing which data fields will be visible on the form; 3) Defining the "workflow" in the form (e.g. if yes to question 2 then go to question 5); 4) Altering or deleting default data field labels; 5) Specifying which data fields are mandatory or have constraints (e.g. floor, ceiling, type of data entered); 6) Editing information contained in a drop down list; 7) Choosing specific types of data capture fields (e.g., text entry, 5 point scale, yes/no etc.); 8) Adding mobile device specific functionality to the form (e.g., audio recording or digital picture); and 9) Adding new or moving form controls and their labels.

Figure 3A:
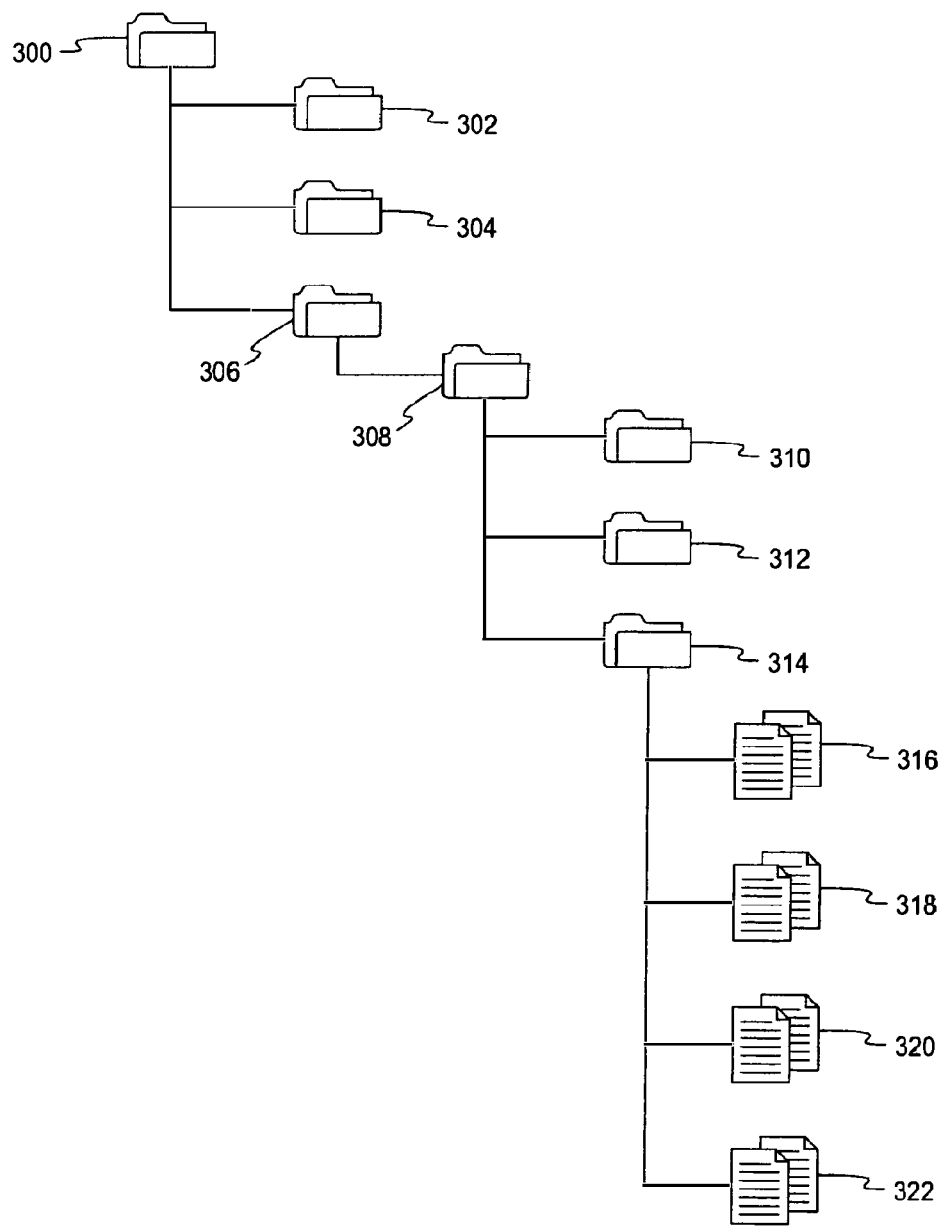
FIG. 3A is an illustration of a block diagram of one file organization used to support a customized mobile-form application.

The mobile-form applications derive the customization based on groups of files which are used to define the customized aspects of the mobile-form application. The user of the interface alters these various files in order to create the customized mobile-form application. FIG. 3A is a block diagram of an example file structure for storage and access of the files necessary to support mobile-form applications. The file structure is used to manage the support files required by mobile-form applications. A form solution folder 300 includes a form documents folder 302, an attachments folder 304 and a general mobile-form application folder 306. The form documents folder 302 includes documents such as a user-guide for the mobile-form applications. The attachments folder 304 contains data files relating to attachments to the mobile-form applications such as video or audio files.

The general mobile-form application folder 306 contains a specific mobile-form application folder 308 it is to be understood that a specific-mobile form application folder similar to the folder 308 and its contents is created for each unique mobile-form application, but only the folder 308 is shown in this example. The specific mobile-form application folder 308 includes a managed list folder 310, a resources folder 312 and a general customizations folder 314. The general customizations folder 314 includes a set of customization file(s) 316, a set of style sheet file(s) 318, a set of data termination configuration file(s) 320 and a set of localization file(s) 322. Each set of files 316-322 is unique for each customized mobile-form application stored on the server 19*d*.

The managed list folder 310 includes managed lists files which the customized mobile-form application uses to interface with external data sources. Typically there files are used to provide pre-populated data within a mobile-form application. The resources folder 312 includes files for providing the customized mobile-form application with logos, images or custom graphics such as the branding images when the customized mobile-form application is being rendered on the mobile device.

The general customization folder 314 generally includes meta-data about what will be customized on the customized mobile-form application. The files in the general customization folder 314 provide a central view of all of the customizations that need to be applied to the customized mobile-form application. The customization file(s) 316 contain(s) information about which localization, style sheet, data termination, managed list and resources that will need to be applied to the customized mobile-form application. When applying customizations it will be the name of the customization folder 314 that the end user will be selecting and applying.

The style sheet file(s) 318 provide a means of changing the look-and-feel aspects of the mobile-form application. This may include colors, fonts, control appearance etc. The style sheet file(s) 318 will also provide the functionality to have skip logic, hide or show controls, etc. The data termination configuration file(s) 320 provide the means of integrating published data instances into back-end applications such as the Salesforce.com application. The localization file(s) 322 provide a means of delivering a single application that can have multiple locals applied to it. The localization file(s) 322 also provide allowing the customization of the actual contents of the mobile-form application (for example allowing a user to change a field label).

Figure 3B:
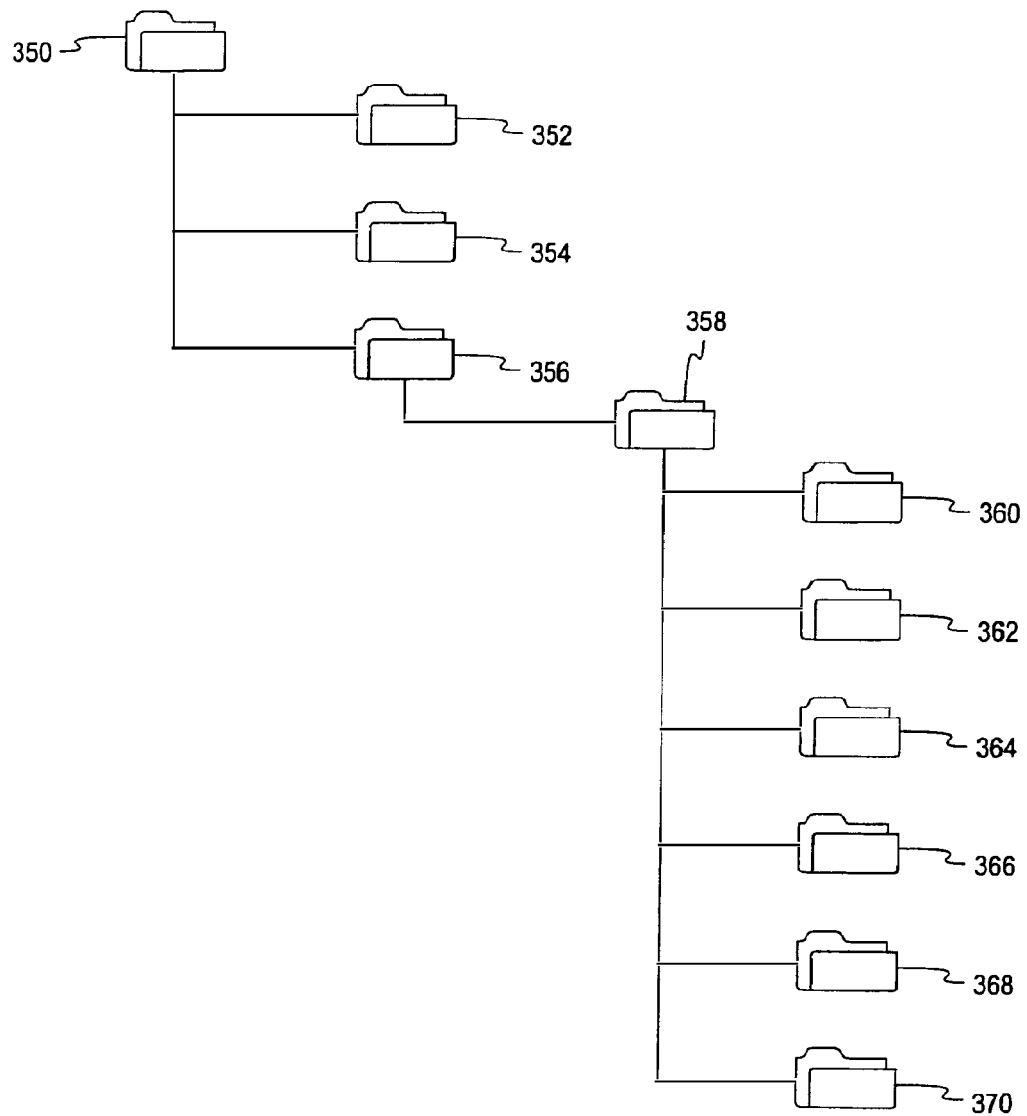
FIG. 3B is an illustration of a block diagram of another file organization used to support a customized mobile-form application.

An alternative file structure for the mobile-form applications is shown in FIG. 3B. The file structure in FIB. 3B creates a new folder for each new customization to the mobile-form application. Thus, specific folders would contain each of the different types of files 316-322 in FIG. 3A and only the specific folder would be changed if the specific file was changed. In contrast, the file structure in FIG. 3A requires the entire customizations folder 314 to be changed if any of the files 316-322 are changed as a result of the customization process. A form solution folder 350 includes a form documents folder 352, an attachments folder 354 and a general mobile-form application folder 356. The general mobile-form application folder 356 contains a specific mobile-form application folder 358. The general mobile-form application folder 358 includes a managed list folder 360, a resources folder 362 and a customizations folder 364, a style sheets folder 366, a localization folder 368 and a data termination configuration folder 370. In this structure, all of the files 316-322 in FIG. 3A for a customized mobile-form application are stored in the respective folders 364-370.

Once the customization is complete, the mobile-form application may be installed onto the mobile devices 18a-f via the Explorer Client 12 in FIG. 1. The interface provided by the mobile-form application will appear just as the user created it from the portal webpage via the portal server 20. The user is also able to go to the webpage via the portal 22 to view the data records that were created by use of the customized mobile form application. The web view of the data also reflects any customization of the mobile-form application (e.g., selected data fields will be displayed, user specific field labels, logos, etc.). Thus, the web interface provides a mechanism for the user to alter a pre-built mobile-form application template to meet specific needs and provide a customized mobile-form application. Several approaches may be used to access the files described with respect to FIGS. 3A-3B above to support the customized mobile-form application.

In one approach, the server 19d performs the extraction of the information contained within the customization file, then the transformation of the style sheet file, and the localization files on the basic mobile-form application. The extraction of information is triggered by a web-service call via the Explorer Client 12 from the mobile device 18e in FIG. 2. This approach allows the performance of the form rendering application 112 in FIG. 2 to remain the same regardless of running customized or standard mobile-form applications. Minimal changes are necessary to the form rendering application 112 and thus backwards compatibility may be maintained. However, when selecting configurations to apply to a mobile-form application, a network connection will be required in order to make a call to the server 19d which then applies the transform. The transformed mobile-form application will also have to be downloaded to the mobile device 18e and then consumed by the mobile form application 112.

A second approach uses the form rendering application 112 to perform the transformation and substitution of the configuration and localization files at run-time. This approach provides a disconnected model when applying existing configurations to the mobile-form application and provides less dependence on the server 19d. However, this approach requires greater initial loading on the mobile device as well as increased storage requirements for the additional files. Of course it is to be understood that a combination of files on the server and the mobile-form application 112 could also be employed.

Figure 4A:
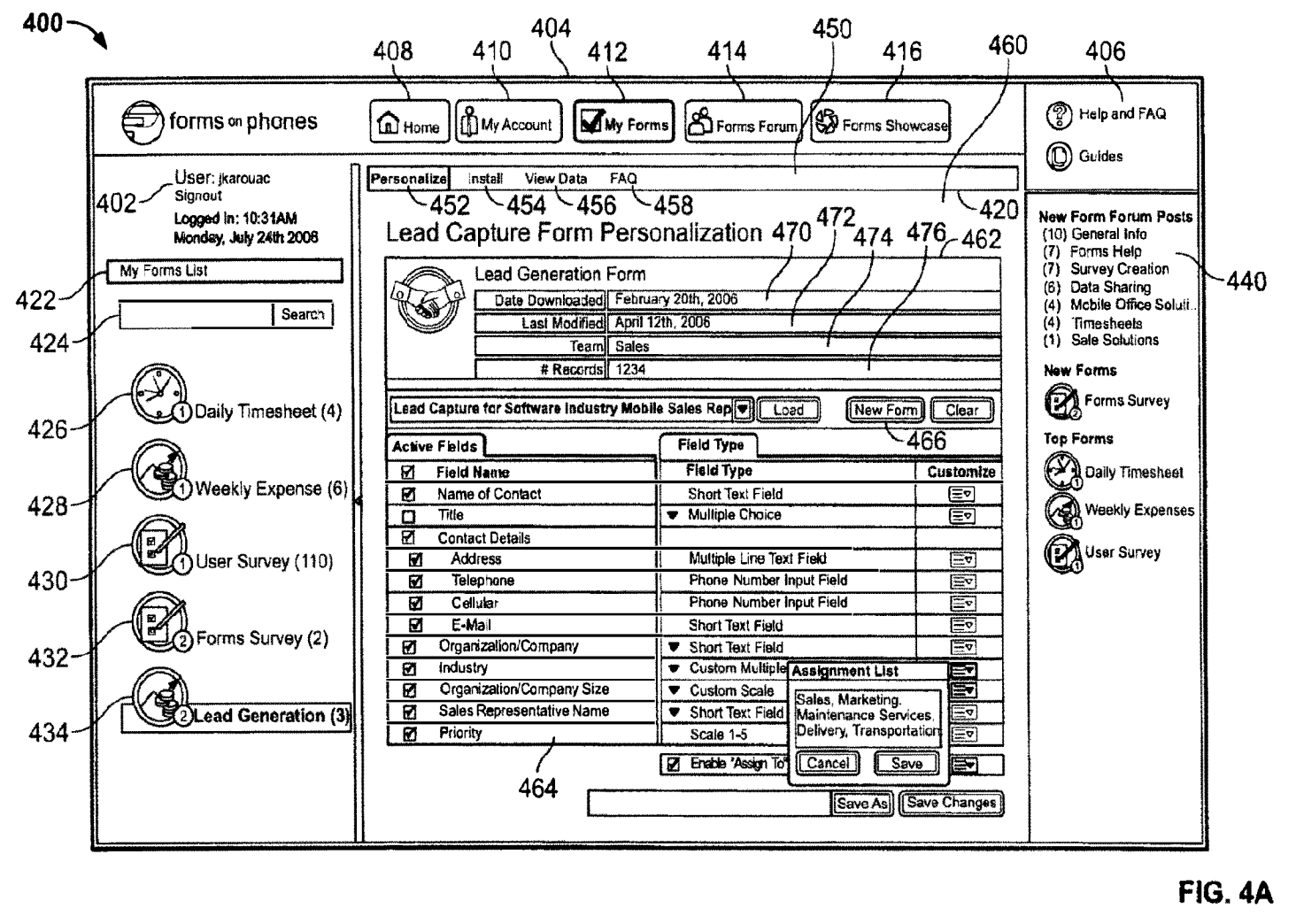

The portal server 20 provides portal functionality to the user via any browser enabled device such as the devices 18a-g in FIG. 1. The portal 22 is available to a user and makes visible the mobile-form application templates that are available on the application server 19 d. The portal 22 also provides a web-based interface to customize certain design elements of those applications. An example of a web-based portal interface 400 is shown as a webpage in FIG. 4A. The web-based interface 400 is displayed via a web-browser on a browser enabled device such as the personal computer 18g in FIG. 1 accessing the portal 22. The web-based interface 400 includes residual controls for different functions available from the portal 22 such as a user identification and log in area 402, a links area 404 and an information area 406. The links area 404 contains links to navigate other webpages supported by the portal 22 which may include a personalized home page link 408, an account link 410, a "my forms" link 412, a forms forum link 414 and a forms showcase link 416. The home page link 408 allows the display of an introduction webpage which includes personal functions to the user such as viewing messages. The account link 410 allows the display of an administrative webpage which includes data relating to the user account and controls from editing such data. The forms form link 414 displays a webpage including comments and messages posted by other users regarding the mobile-form applications. The forms showcase link 416 allows the display of a webpage containing a catalog and description of available mobile-form applications.

In this example, the user has selected the "my forms" link 412 which results in the display of a forms details area 420. A forms list area 422 includes a display of available mobile-form applications to the user and is a default area on any webpage accessed through the portal 22. In the forms list area 422, the user may search for mobile-form applications via name or part of a name using a search box 424. In this example, the available forms are accessible via the type of form represented by a timesheet icon 426, a weekly expense icon 428, a user survey icon 430, a forms survey icon 432 and a lead generation icon 434. The icons 426-434 display the number of form applications available to the user in each category as well as the number of times the form application has been used. Selecting, an icon such as the lead generation icon 434 will result in the display of a window showing the data collected via the represented form application A forum area 440 is also available to provide a user access to postings from other users regarding forms.

The forms details area 420 in this example includes a menu choice area 450 that includes a personalize or customize selection 452, an install selection 454, a view data selection 456 and an information selection 458. The install selection 454 opens a window to give the user options to install the completed mobile-form application to specific mobile devices and to make available the mobile-form application to users of the mobile devices such as the mobile devices 18a-f in FIG. 1. The view data selection 456 opens a window to show data collected by previously created customized mobile-form applications associated with the user. The information selection 458 opens a window for the user to obtain help information.

In this example, the user has selected the personalize selection 452 which results in the display of a customization interface 460. In this example, the customization area 460 displays a mobile-form application template directed toward collecting data on sales leads. The lead generation mobile-form application in this example may be used to record data from sales leads on a mobile device. The customization interface 460 includes a form generation information area 462, a field selection area 464, and a file management area 466. The form generation information area 462 includes a date downloaded field 470, a last modified field 472, a team field 474, and a records field 476. The fields 470, 472, 474 and 476 are used to identify and classify a mobile-form application template created by the template design station 102 in FIG. 2 and its availability to the user. Of course, different types of fields may be used to identify and classify form definition files for mobile-application forms, other than those in this example.

Figure 4B:
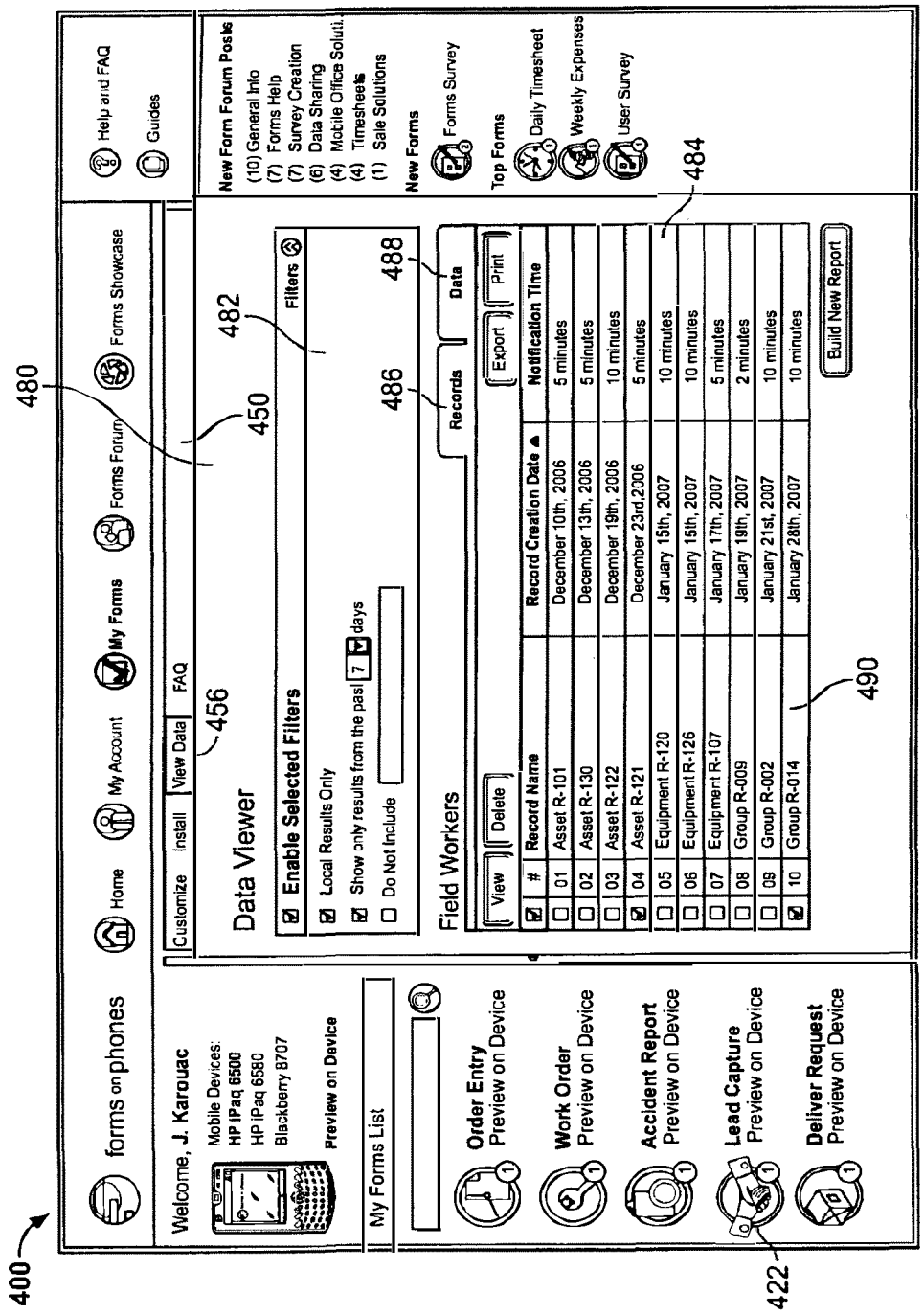
FIG. 4B is an illustration of a screen view of the portal web-site in FIG. 4A with a data viewing interface summarizing data collected via a customized mobile-form application.

FIG. 4B is a screen shot of a data viewing area 480 which is displayed on the web-based interface 400 when an icon in the forms list area 422 or the view data selection 456 in the menu choice area 450 is activated. The data viewing area 480 includes a filtering control area 482 and a data summary area 484. The filtering control area 482 includes various filters which may be applied to data collected by the selected mobile-form application. The data summary area 484 has a records tab 486 and a data tab 488. The records tab 486 has been selected in FIG. 4B and results in a records summary table 490 which shows the name of the data record, the creation date and the notification time of each record submitted by the mobile-form application. The specific data related to each report may be viewed by selecting the data tab 488. The data summary area 484 has various controls to allow the export, printing and creation of a data record.

FIG. 5A is a close-up view of the field selection area 464 and the file management area 466 of the customization interface 460 in FIG. 4. As seen in FIG. 5A, the field selection area 464 contains a field name column 500 and a field type column 502. The field name column 500 includes selections of field names 504 which may be included in the customized mobile-form application such as "Name of Contact," "Title," "Contact Details," "Organization." "Industry," "Company Size," "Sales Representative Name," "Priority," etc. Certain field names such as "Contact Details" include subfields such as address, telephone, cellular, e-mail, etc. Each of the field names 504 has a check box 506 which allows selection of the field for inclusion in the customized mobile-form application by the user. The field type column 502 includes different field types 508 which may be selected to correspond to each field name 504. The field types are listed in pull down menus and allow the formatting of the data to be entered in each selected field name 504. For example, field types may include text, multiple choice, short text, numerical scale, etc. For certain field types, such as a multiple choice field type 510 or a short text field type 512, additional pull down menus are available for different formatting alternatives for the particular field type (i.e., number of choices for a multiple choice selection).

In this example, a user is able to customize a mobile-form application that captures sales lead information. The check boxes 506 determine which fields will appear on the mobile-application form. In the example interface 500, the "Title" field is marked OFF (via the lack of a check mark in the check box 506), so it will not appear in the completed mobile-application form. Correspondingly, the "Name of Content," "Contact Details," "Organization," "Industry," "Company Size," "Sales Representative Name" and "Priority" fields have been selected and will appear on the completed customized mobile-form application A user may change field names by clicking on the label name of the field name 504. A text entry prompt will appear, and the user can type a different label to change the name of the field.

A customize column 520 includes a text link 522 which may be selected to allow a user to enter text data in conjunction with the field type. For example, a user has selected the field type labeled "enable 'assign' to forwarding" in FIG. 5A that allows selection of an individual to follow up on the entered lead. FIG. 5B is a screen shot which shows the resulting pop-up assignment list box 530 which appears when the corresponding text link 522 is selected. The box 530 allows the creation of a drop down list—in this case an "assignment" list (e.g., the employees of the organization who may have the responsibility to follow up a lead) The user enters the potential choices in the text box 530. The choices may be saved via a save button 532 or canceled via a cancel button 534. The choices will appear as selections when a user of the custom mobile-form application wishes to assign the lead to one of the selections.

The example mobile-form application shown in FIG. 5A is a form that would probably be customized only once because of the nature of the purpose of the form (i.e., recording sales leads). However, other types of forms, such as a survey form, could potentially be changed on a periodic basis such as every day or every week. The ease of changes via a web browser enables users to make the needed changes without requiring any programming. Changes may also be made often if needed, with an altered form re-installed on a mobile device within a few minutes via the server 19*d* and the Explorer Client 12.

Additional customizable mobile-form application templates may be obtained via the controls in the file management area 466. The file management area 466 includes a title field 540, a load option 542, a new form option 544 and a clear option 546. The title field 540 includes a drop down menu which shows the names of all the mobile-form applications which are available to the user. The load option 542 allows a user to load a selected mobile-form application. The new form option 544 allows the creation of a new form via the controls in the field selection area 464. The clear option 546 clears any existing displayed mobile-form applications.

Once the fields have been selected, a user may use the controls to retain and store the completed customized mobile-form application A save option 550 saves the mobile-application form under the same file name. A save as option 552 saves the mobile-application form under a new file name which may be entered in a text field 554.

Another example of customizing a mobile-form application through the portal 22 is shown in FIG. 6A which is a screen shot of a second customization interface 600 used to create a customized survey based mobile-form application. The survey based mobile-form application in this example is more open-ended allowing for greater user design in contrast the lead generation mobile-form application in FIG. 5A which is more limited to selecting and altering default fields on the template. The customization interface 600 in FIG. 6A is displayed in the customization area 420 in FIG. 4A when a survey type customizable mobile-form application template is selected by the user. The customization interface 600 includes a question column 602 and an answer type column 604. The question column 602 includes a series of questions 606 which include text fields 608 having the text of the questions to be asked in the survey. The content of the text fields 608 are customizable by the user by entering text in the text field 608 which will appear as questions in the mobile-form application. An add new question option 610 allows a user to add a new question to the survey.

The answer type column 604 includes different selections of the types of answers which will be made available to the mobile-application form in response to a certain question. The options in this example include a 1-5 scale selection 620, a yes/no selection 622, a text selection 624, and a choice selection 626. It is to be understood that other types of answer selections may be displayed in the answer type column 604 including selections that are specialized by the user and/or the designer of the mobile-application form template. Each of the selections 620-626 may be selected by a selection button 628. Each question has one answer type selected. The choice selection 626 when selected enables the display of a selection editor icon 630 which allows further customization of answer choices. A voice selection 632 may be enabled by selected a check box 634. The voice selection 632 allows a user to input voice responses to the question which will be stored as data on the mobile device using the mobile-form application in conjunction with the form rendering application 112 in FIG. 2.

Figure 6B:
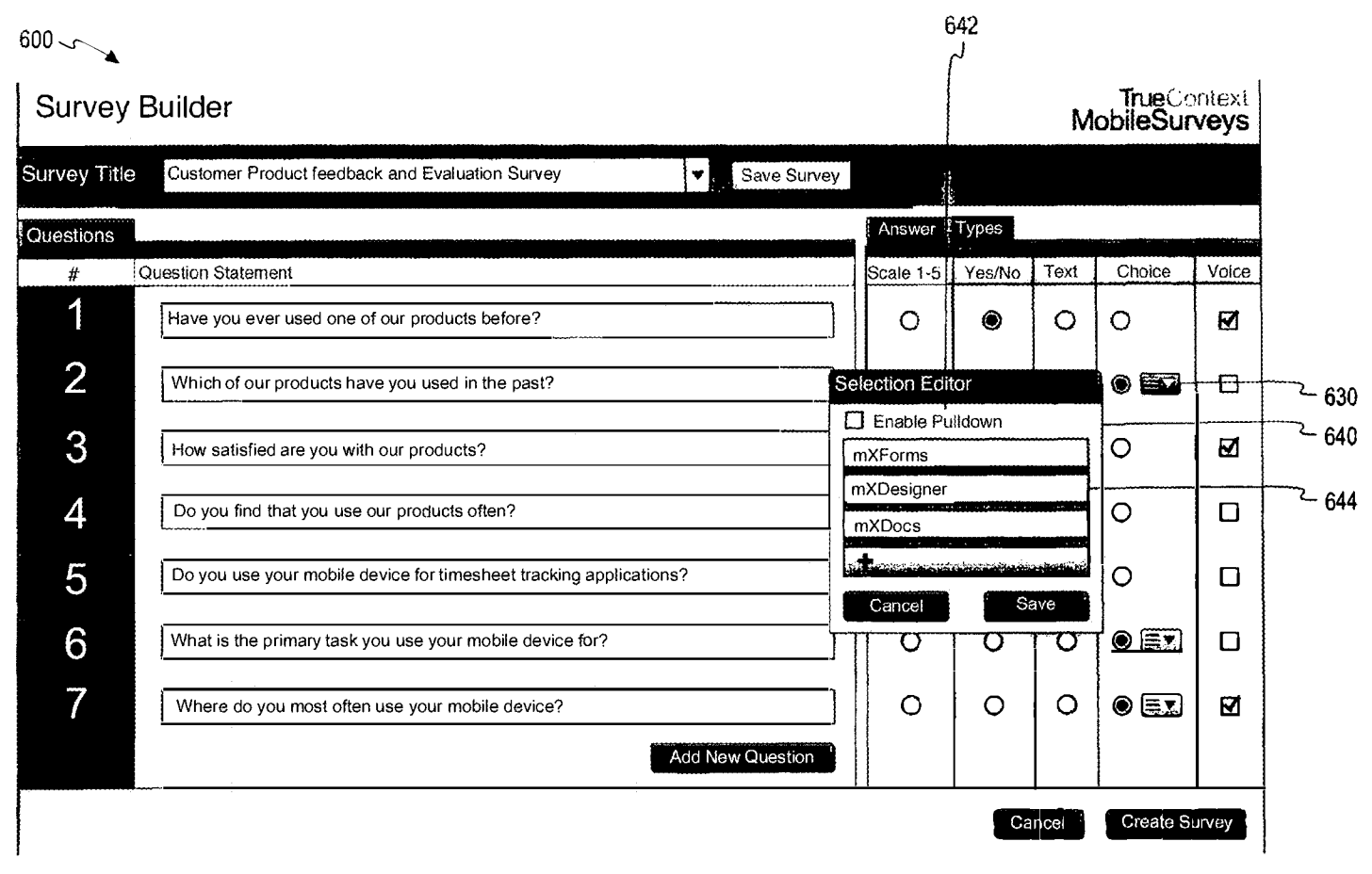

FIG. 6B shows the result when a selection editor icon 630 is selected for a question in FIG. 6A. FIG. 6B shows a pop-up window 640 which includes function for a selection editor. The pop-up window 640 includes an enable pull down option 642 which may be selected via a check box. A series of choices are then offered in text boxes 644 as selectable answers to the question, which may be edited by the user. The choices may be saved via a save button 650 or canceled via a cancel button 652.

Figures 7A, 7B, 7C, 7D, 7E:
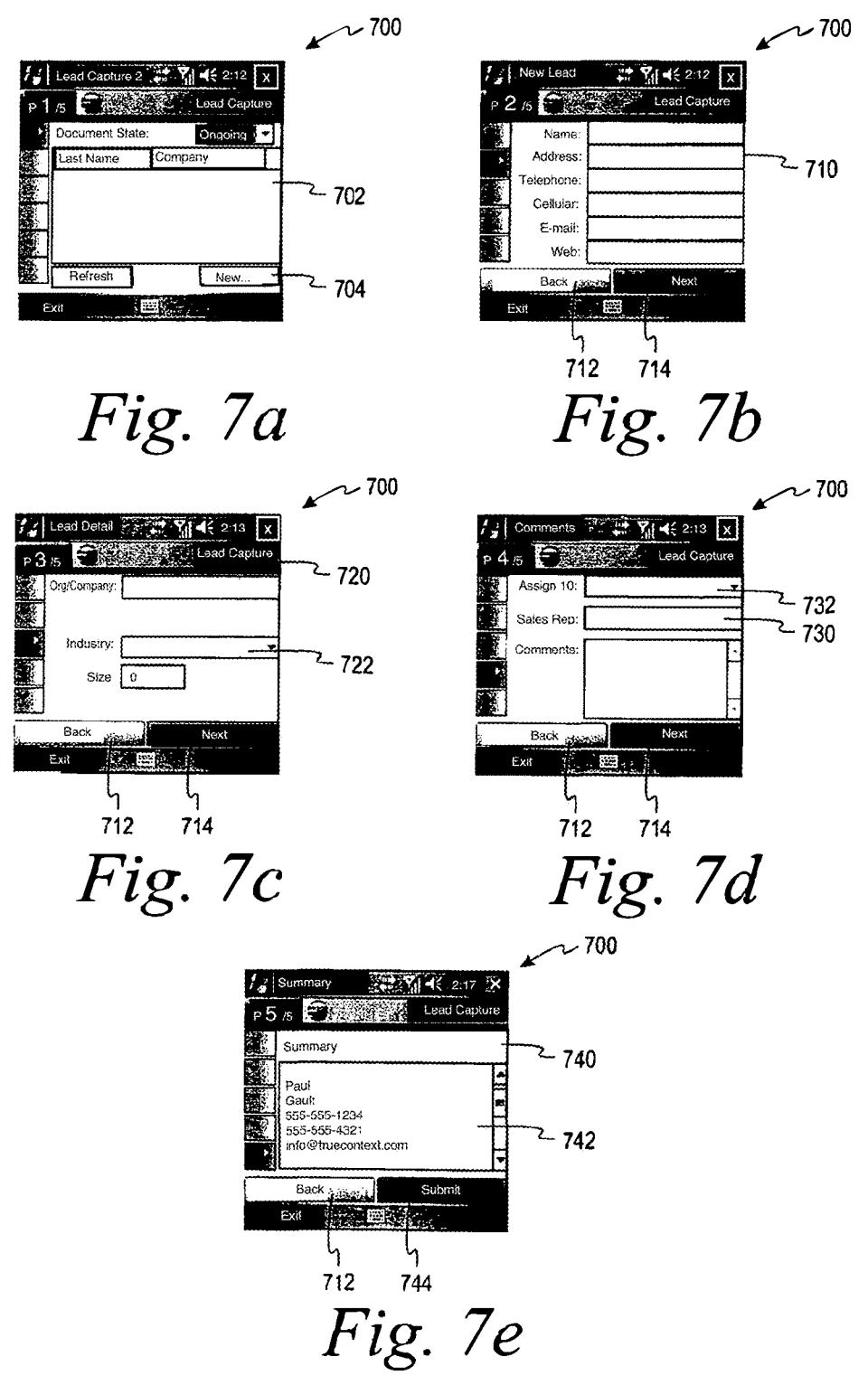

FIGS. 7A-7E are screen shots of a display 700 of a mobile device such as the mobile device 18e in FIG. 2 which are rendered by the form rendering application 112 in operating the customized sales lead mobile-form application shown in FIG. 5A FIG. 7A shows a start up screen 702 for the customized sales lead mobile-form application. The start up screen 702 includes a new contact button 704. Selecting the new contact button 704 allows data fields to be displayed according to the customizations supplied in the customization interface 460 shown in FIG. 5A. For example, a first input screen 710 is shown on the display 700 in FIG. 7B. The input screen 710 includes a name field, an address field, a telephone field, a cellular field, an e-mail field and a web field which were selected by the customization interface 460 shown in FIG. 5A. Other potential default data fields available such as the title field, the fax field and the instant messaging field are not shown in the input screen 710 because they were not selected by the customization interface 460. The user can navigate to different screens using a back button 712 and a next button 714.

FIG. 7C is a screen shot of a second input screen 720 appearing on the display 700 that contains an organization/company field, an industry field and a size field as designated by the customization interface 460 in FIG. 5A. The industry field data field includes a drop down menu 722 which will include customized choices selected and entered by the user via the customization interface 460 in FIG. 5A.

FIG. 7D is a screen shot of a third input screen 730 appearing on the display 700 that includes an assign to field and a representative field which were selected by the user via the customization interface 460 in FIG. 5A. The assign to field also includes a drop down menu 732 which includes the choices entered by the user via the pop-up assignment list box 530 in FIG. 5B.

After all the fields are completed, the collected data may be summarized by the mobile-form application. FIG. 7E is a screen shot of a summary screen 740 appearing on the display 700. The summary screen 740 includes a text box 742 which shows the collected data from the fields in the input screens 710, 720 and 730. The summary screen 740 includes a submit button 744 which allows a user to submit the collected data to be saved on the mobile device, to be sent to a central database such as the database 19a or a server 19d to make the data available via a web server such as the portal server 20. Of course, any combination of these options or all of these options may be used to record the data which may be designated by the customization interface.

Figure 8A:
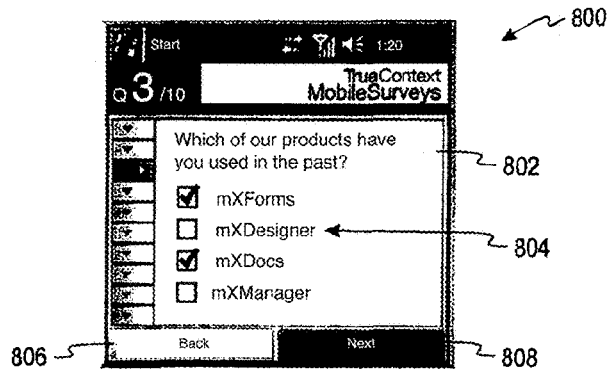
FIGS. 8A-8C illustrate screen views of a mobile device display resulting from the operation of the customized survey mobile-form application in FIG. 6A.
Figure 8B:
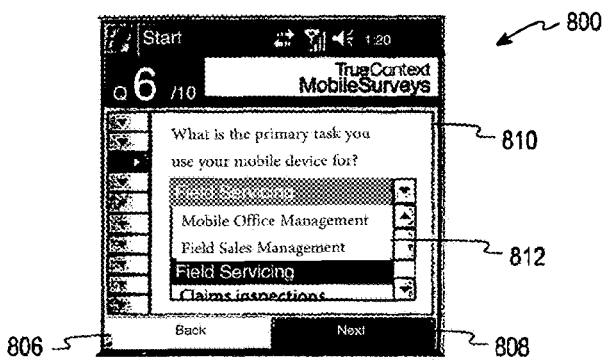
Figure 8C:
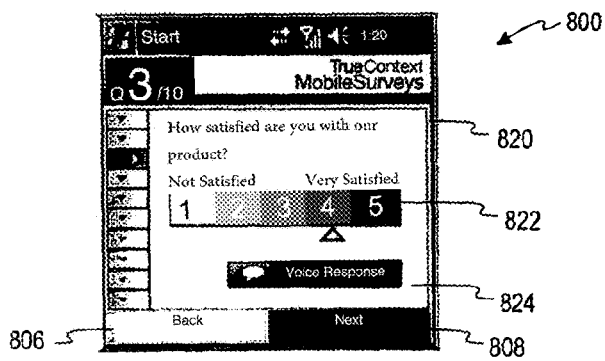

FIGS. 8A-8C are screen shots of a display 800 of a mobile device such as the mobile device 18e in FIG. 2 which are rendered by the form rendering application 112 in operating the customized survey mobile-form application shown in FIG. 5A. Each of the input screens correspond to a different question that was created using the customization interface 600 in FIG. 6A. For example FIG. 8A shows an input screen 802 appearing on the display 800 which asks the second question shown in the question area 602 in the customization interface 600 in FIG. 6A. A group of selectable answers 804 appear with corresponding check boxes to record the user answers. The selectable answers 804 are created by the user via the selection editor icon 630 of the customization interface 630 in FIG. 6B The user may navigate through different input screens (questions) via a back button 806 and a next button 808.

FIG. 8B shows another example input screen 810 appearing on the display 800 which asks the sixth question shown in the question area 602 in the customization interface 600 in FIG. 6A. A group of selectable answers appear in a scrolled list 812. The selectable answers 812 are created by the user via the selection editor icon 630 of the customization interface 600 in FIG. 6B. Unlike the input screen 802 in FIG. 8A, only one answer may be selected from the scrolled list 812.

FIG. 8C shows another example input screen 820 appearing on the display 800 which asks the third question shown in the question area 602 in the customization interface 600 in FIG. 6A. Since the user has designated an answer type of a scale 1-5 in the customization interface 600, a selectable scale graphic 822 is displayed. The user has also selected voice response in the voice column 634 for this question in the customization interface 600 so a voice response button 824 is displayed in FIG. 8C. Selecting the voice response button 824 allows the mobile device user to record a response to the question.

Figure 9:
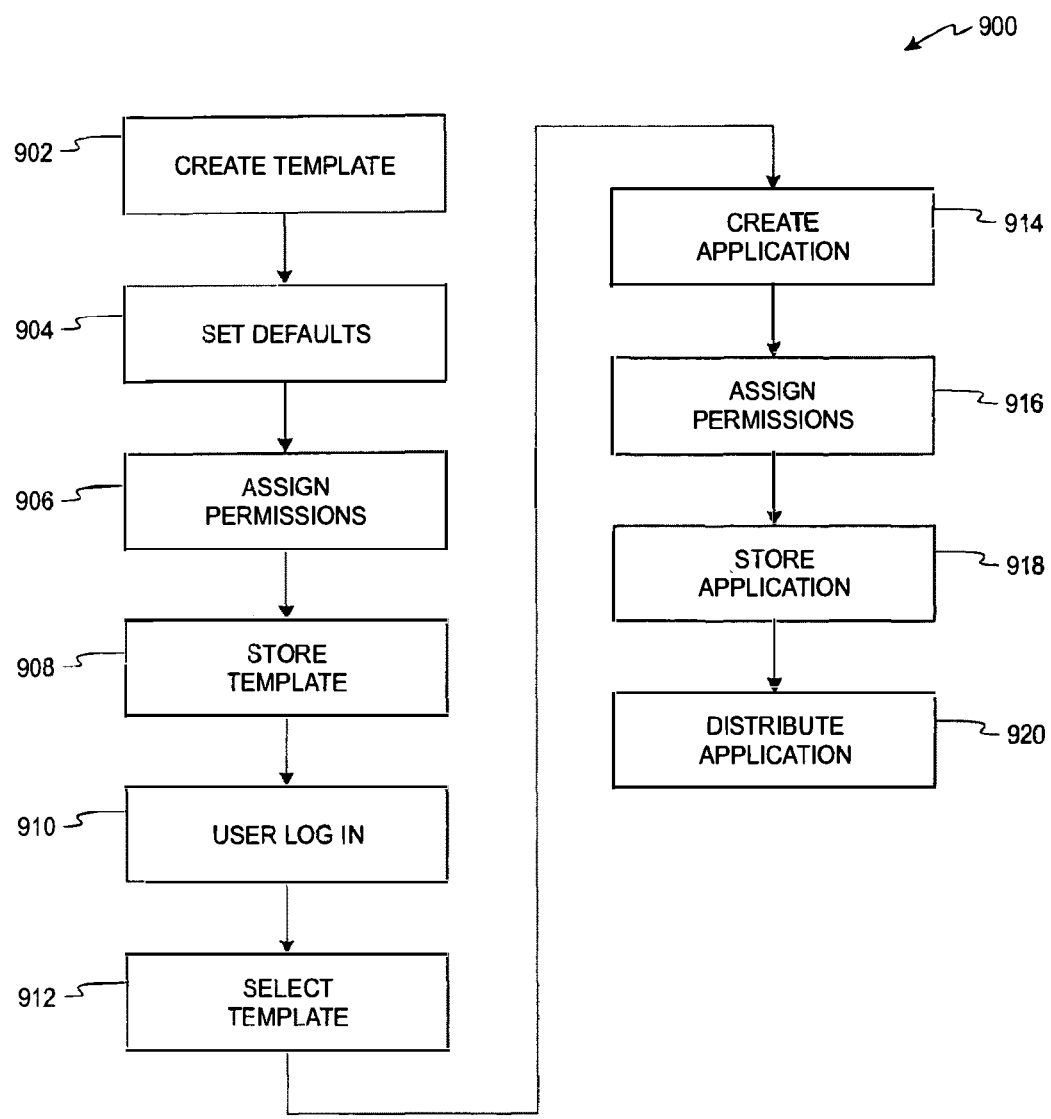
FIG. 9 illustrates a flow diagram of the process performed by the system in FIG. 1 to customize a mobile-form application.

FIG. 9 is a flow diagram 900 of the process used by the server 19d in order to design a customizable form and transmit the updated form to a mobile device such as the mobile device 18e in FIG. 2. The flow diagram 900 representative of example machine readable instructions for implementing the modules 130, 132 and 134 of FIG. 2. In this example, the machine readable instructions comprise an algorithm for execution by: (a) a processor, (b) a controller, and/or (c) any other suitable processing device. The algorithm may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it maybe implemented by an application specific integrated circuit (ASIC), a programmable logic device (PLD), a field programmable logic device (FPL D), discrete logic, etc.). For example, any or all of the customization module 130, the template forms module 132 and the mobile-form application distribution module 134 could be implemented by software, hardware, and/or firmware. Also, some or all of the machine readable instructions represented by the flowchart of FIG. 9 may be implemented manually. Further, although the example algorithm is described with reference to the flowchart illustrated in FIG. 9, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The customizable mobile-form application template is created by the template design station 102 in FIG. 2 in step 902. The customizable mobile-form application template is assigned default features for data collection such as fields, look and feel, mobile device functionality, sequence flow, access to external data, etc. in step 904. The range of permissible users is then assigned to the customizable mobile-form application template in step 906. The completed customizable mobile-form application template is then deployed via the deployment tool 124 in FIG. 2 to the server 19*d*.

The template forms module 132 receives the mobile-form application template in step 908 and stores the related files and folders. A web-enabled device user then logs into the system 10 in step 910. The user may select the customizable mobile-form application template from all accessible templates stored on the server 19*d* in step 912. The user then performs customization of the mobile-form application template to create a customized mobile-form application in step 914. As explained above, the customization process is managed by the portal server 20 in conjunction with the customization module 130 in FIG. 2. The web-interface such as the web-based interface 400 in FIG. 4A allows a user options to select different data fields for inclusion in the customized mobile-form application. The user then assigns the permissions for distributing the customized mobile-form application in step 916. The server 19*d* stores the folders and files associated with the customized mobile-form application in step 918. The mobile-form application distribution module 134 then distributes the customized mobile-form application via the Explorer Client 12 through the Gateway 14 to the permitted mobile devices in step 920.

Figure 10:
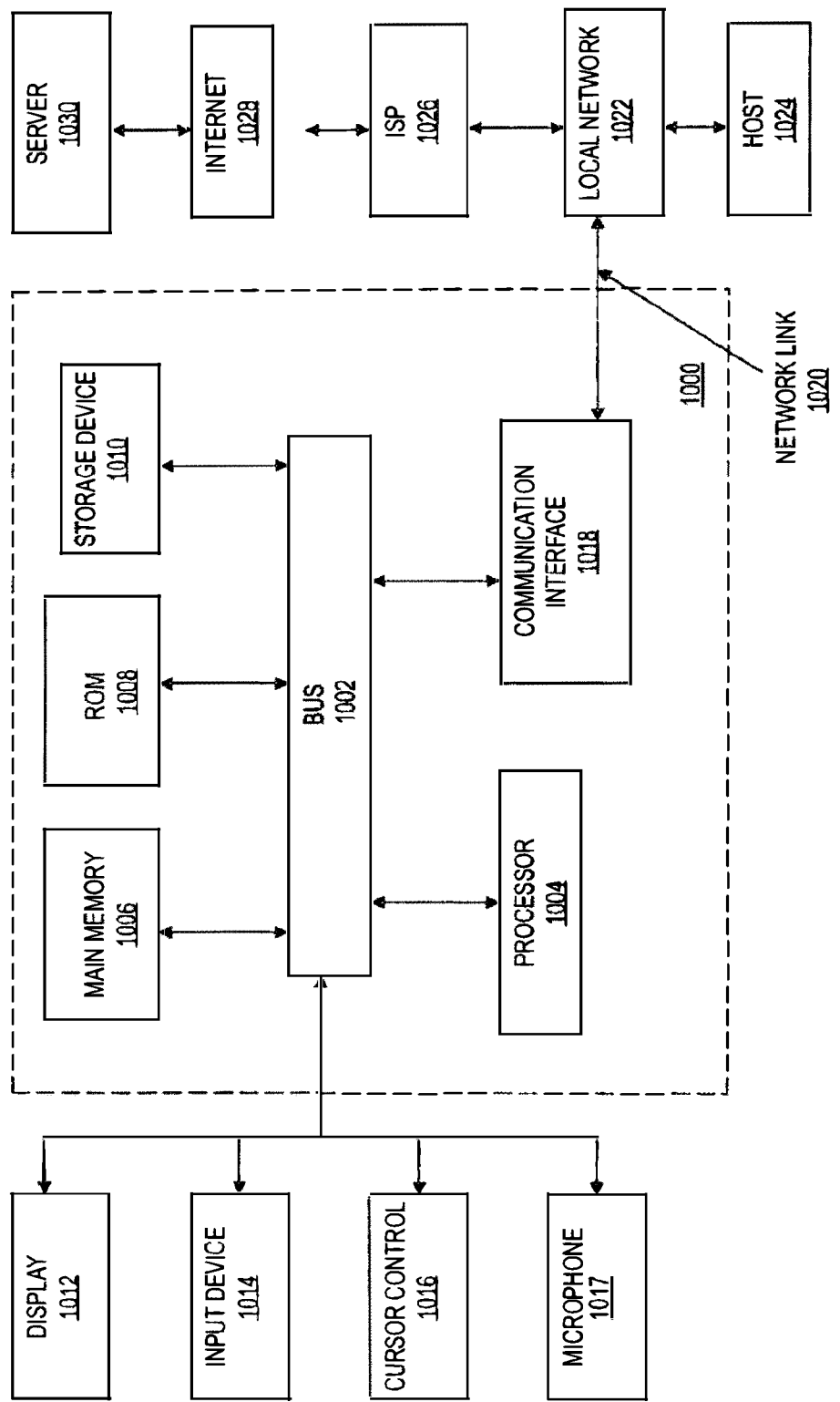
FIG. 10 is a block diagram that illustrates a computer system upon which embodiments of the invention may be implemented.

FIG. 10 is a block diagram that illustrates a computer system 1000 upon which embodiments of the invention may be implemented. Computer system 1000 includes a bus 1002 or other communication mechanism for communicating information, and a processor or processors 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as, for example, a magnetic disk or optical disk, is provided and coupled to bus 1002 for storing information and instructions.

Computer system 1000 may be coupled via bus 1002 to a display 1012, such as a cathode ray tube (CRT), liquid crystal display (LCD), or may be a handheld active or passive display, for displaying information to a computer user. An input device 1014, including alphanumeric and other keys, is coupled to bus 1002 for communicating information and command selections to processor 1004. Other user input devices include cursor control 1016 or microphone 1017. Cursor control 1016 may include one or more of any number of devices, such as, for example, a mouse, a trackball, or cursor direction keys for communicating direction information and command selections to processor 1004 and for controlling cursor movement on display 1012. The cursor control 1016 typically has two degrees of freedom in two axes, a first axis (e.g., x) and a second axis (e.g., y), allowing the device to specify positions in a plane.

Execution of sequences of instructions contained in main memory 1006 causes processor 1004 to perform the process steps described above. One or more processors in a multi-processing arrangement may also be employed to execute the sequences of instructions contained in main memory 1006. In alternative embodiments, hard-wired circuitry may be used in place of or in combination with software instructions and it is to be understood that no specific combination of hardware circuitry and software are required. Instructions may be provided in any number of forms such as source code, assembly code, object code, machine language, compressed or encrypted versions of the foregoing, and any and all equivalents thereof. "Computer-readable medium" refers to any medium that participates in providing instructions to processor 1004 for execution and "program product" refers to such a computer-readable medium bearing a computer-executable program. The computer usable medium may be referred to as "bearing" the instructions, which encompass all ways in which instructions are associated with a computer usable medium. Computer-readable mediums include, but are not limited to, non-volatile media, volatile media, and transmission media Non-volatile media include, for example, optical or magnetic disks, such as storage device 1010. Volatile media include dynamic memory, such as main memory 1006. Transmission media include coaxial cables, copper wire and fiber optics, including the wires that comprise bus 1002. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be borne on a magnetic disk of a remote computer. The remote computer can load the instructions into its dynamic memory and send the instructions over a telephone line using a modem. A modem local to computer system 1000 can receive the data on the telephone line and use an infrared transmitter to convert the data to an infrared signal. An infrared detector coupled to bus 1002 can receive the data carried in the infrared signal and place the data on bus 1002. Bus 1002 carries the data to main memory 1006, from which processor 1004 retrieves and executes the instructions. Instructions received by main memory 1006 may optionally be stored on storage device 1010 either before or after execution by processor 1004.

Computer system 1000 may also include a communication interface 1018 coupled to bus 1002 to provide a two-way data communication coupling to a network link 1020 connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network, now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information. Thus the processing required by method of the invention described by way of example herein may be implemented on a local computer utilizing storage device 1010 or may be implemented, for example, on a LAN or over the Internet.

Computer system 1000 can send messages and receive data, including program code, through the network(s), network link 1020, and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution. In this manner, computer system 1000 may obtain application code in the form of a carrier wave.

This application incorporates by reference, in its entirety, the following U.S. patent applications "Mobile Core Client Architecture," by Marc Chéné, Liam Peyton, Kevin McGuire, and Brant Drummond, U.S. patent application Ser. No. 60/884,785, "Methods And System For Orchestrating Services And Data Sharing On Mobile Devices," by Marc Chéné, Liam Peyton, Kevin McGuire, and Brant Drummond, U.S. patent application Ser. No. 660/880,328, and "Real Time Records And Dashboards From Aggregated Mobile Data," by Mitch A. Brisebois, Arjun Mehta, Kevin McGuire, and Cyril Soga, U.S. patent application Ser. No. 60/880,176, each of which is being filed concurrently herewith on Jan. 12, 2007. Each of the aforementioned U.S. patent applications are assigned to or under obligation of assignment to TrueContext Corp. of Ottawa, Canada.

This application expressly incorporates herein by reference, in its entirety, U.S. Published Patent Application Nos. US2006161646, entitled "Policy-Driven Mobile Forms Applications," published Jul. 20, 2006, US20060080397, entitled "Content Management Across Shared, Mobile File Systems," published Apr. 13, 2006, and 20060089938, titled "Distributed Scalable Policy Based Content Management," published on Apr. 27, 2006, each of which are assigned to TrueContext Corp. of Ottawa, Canada. This application also expressly incorporates herein by reference, in its entirety, International Publication No WO 2004/013782 A1, titled "Contextual Computing System," published on Feb. 12, 2004, which is assigned to TrueContext Corp. of Ottawa, Canada.

While the presently disclosed concepts have been described with reference to one or more particular embodiments, those skilled in the art will recognize that many changes may be made thereto without departing from the spirit and scope of the presently disclosed concepts. For example, although the above examples relate to a web-based interface for producing customized mobile-form applications, such an interface may be produced via a stand-alone work station and the resulting forms may be provided to the mobile devices. Any combination and/or sub-combination of the examples, embodiments, aspects, claims, methods, acts, processes, claim elements, or components disclosed herein, however termed, are expressly contemplated as falling within the present concepts. For example, although various aspects of the present concepts are set forth in the appended claims, wherein the dependent claims relate back to selected preceding claims, including the independent claim, it is to be understood that each of the dependent claims may properly depend from any of the preceding claims, to the extent not logically excluded, in accord with aspects of the present concepts. Thus, for example, the present concepts expressly include every possible combination of dependent claims with their respective independent claim, regardless of stated dependency. Further, the presently disclosed concepts are considered to include, without limitation, any combination and/or sub-combination of the disclosed examples, embodiments, aspects, claims, methods, acts, processes, claim elements, or components disclosed herein with the examples, embodiments, aspects, claims, methods, acts, processes, claim elements, or components disclosed in the references and applications incorporated by reference herein.

The invention claimed is:

1. A method of customizing a mobile-form to share data between a plurality of mobile devices, the method comprising:
   selecting by a user, a mobile-form template from a plurality of mobile-form templates stored on a server;
   customizing by the user one or more elements of said selected mobile-form template to create a customized mobile-form;
   distributing, via said server, said customized mobile-form to a plurality of mobile devices, to collect a plurality of data and store said data on said server;
   transforming and validating the collected data based on one or more policies; and
   sharing said data to one or more targeted resources based, in part, on network conditions, to one or more of the plurality of mobile devices, based on said one or more policies.

2. The method of claim 1, wherein said policies comprise an update function selecting the data to share.

3. The method of claim 1, wherein said mobile-form includes at least one data field having an associated label and said customizing of the mobile-form includes specifying one of said labels in order to assist data collection corresponding to one of said elements.

4. The method of claim 1, wherein said customizing of the mobile-form includes specifying a default value associated with an element.

5. The method of claim 1, wherein said customizing of the mobile-form includes specifying whether data entry in an element is mandatory.

6. The method of claim 1, wherein said customizing of the mobile-form application includes choosing a specific type of data format for an element.

7. The method of claim 1, wherein said customizing of the mobile-form includes an option of adding a logo, an image or a custom graphic or a combination thereof to the customized mobile-form.

8. The method of claim 1, wherein said customizing of the mobile-form includes specifying the order in which elements are displayed to the user for data collection on the customized mobile-form.

9. The method of claim 1, wherein said sharing of data comprises data compression.

10. A system for customizing a mobile-form to manage the sharing of data between a plurality of mobile devices, the system comprising:

a mobile-form template selected from a plurality of mobile-form templates stored in a server;

said selected mobile-form template being customized by a user using a computing device to create a customized mobile-form;

said customized mobile-form application being distributed to a plurality of mobile devices, to collect and display a plurality of data;

said plurality of data being transformed and validated based on one or more policies, prior to being displayed; and said transformed and validated data being shared to one or more targeted resources based, in part, on network conditions, to one or more of the plurality of mobile devices based on said one or more policies.

11. The system of claim 10, wherein said mobile-form includes at least one data field having an associated label corresponding to at least one of said elements and said customized mobile-form specifies one of said labels in order to assist data collection corresponding to one of said elements.

12. The system of claim 10, wherein said customized mobile-form includes a default value associated with an element.

13. The system of claim 10, wherein said customized mobile-form indicates whether data entry in an element is mandatory.

14. The system of claim 10, wherein said customized mobile-form further includes a specific type of data format for an element.

15. The system of claim 10, wherein said customized mobile-form application further includes an option of adding a logo, an image or a custom graphic or a combination thereof to the customized mobile-form application.

16. The system of claim 10 wherein said sharing of data comprises data compression.

* * * * *